(12) United States Patent
Bagheri et al.

(10) Patent No.: US 6,623,230 B1
(45) Date of Patent: Sep. 23, 2003

(54) CAN SEAM FORMING APPARATUS

(75) Inventors: Ali Bagheri, Newbury, OH (US); Jeffrey K. Bernstein, Canton, OH (US)

(73) Assignee: Pneumatic Scale Corporation, Akron, OH (US)

( * ) Notice: Subject to any disclaimer, the term of this patent is extended or adjusted under 35 U.S.C. 154(b) by 0 days.

(21) Appl. No.: 09/555,403

(22) PCT Filed: Aug. 18, 1997

(86) PCT No.: PCT/US97/14471
§ 371 (c)(1),
(2), (4) Date: May 30, 2000

(87) PCT Pub. No.: WO98/07534
PCT Pub. Date: Feb. 26, 1998

Related U.S. Application Data

(60) Provisional application No. 60/023,673, filed on Aug. 21, 1996.

(51) Int. Cl.[7] ............................................. B21D 51/26
(52) U.S. Cl. ................. 413/4; 413/6; 413/31; 413/40; 413/41
(58) Field of Search ................. 413/6, 27, 31, 413/2–4, 40, 41

(56) References Cited

U.S. PATENT DOCUMENTS

| | | | | |
|---|---|---|---|---|
| 3,908,572 A | * | 9/1975 | Johnson et al. | 413/27 |
| 4,091,757 A | * | 5/1978 | Urban | 413/70 |
| 4,205,617 A | * | 6/1980 | Chmielowiec | 413/27 |
| 4,600,347 A | * | 7/1986 | Segredo et al. | 413/26 |
| 4,606,205 A | * | 8/1986 | Segredo et al. | 72/21.4 |
| 5,142,769 A | * | 9/1992 | Gold et al. | 29/621.1 |
| 5,560,238 A | * | 10/1996 | Allebach et al. | 72/13.4 |
| 5,860,782 A | * | 1/1999 | Campbell | 413/6 |
| 6,105,341 A | * | 8/2000 | Campbell | 53/432 |

FOREIGN PATENT DOCUMENTS

WO    WO 98/07534    *   2/1998

* cited by examiner

*Primary Examiner*—William Hong
(74) *Attorney, Agent, or Firm*—Ralph E. Jocke; Daniel D. Wasil; Walker & Jocke

(57) ABSTRACT

A double seam forming apparatus for applying end units to can bodies includes a can seamer (12) with a seaming cam (46). Seaming cam (46) includes a high dwell portion (56) which deforms responsive to force encounterred by tooling during forming of a can seam. A reinforcing pin (72) limits deformation of the high dwell portion to prevent damage. The high dwell portion of the cam includes a force sensor (20) which generates a signal responsive to strain of the high dwell portion due to applied force. The apparatus further includes a monitor apparatus (28). The monitor apparatus includes a controller (30) which includes a processor and a data store (32), and a host station (38). The monitor apparatus is operative to identify seam fault conditions and to store data concerning seamer conditions. The monitor apparatus also operates a can ejector (26) to divert cans identified as having defective seams.

21 Claims, 20 Drawing Sheets

FIG. 24

CAN SEAM FORMING APPARATUS

This application claims the benefit of provisional application Ser. No. 60/023,673 filed Aug. 21, 1996.

TECHNICAL FIELD

This invention relates to can closing machines. Specifically this invention relates to a double seam forming can closing apparatus which identifies defects and rejects cans with improper seams. This invention further relates to a double seam forming can closing apparatus in which the seam forming parameters may be set up more rapidly and reliably.

BACKGROUND ART

Canning equipment and processes are commonly used in a variety of industries. Canning processes are often used to preserve food products because such products can be processed and promptly hermetically sealed within a can. Canning operations may be performed at high speed and at a reasonable cost. The sealing of cans is important because an improper seal may result in the infiltration of air to the interior of the can. This may result in bacterial growth and premature spoilage.

Can closing machines are known in the prior art. One type of can closing machine secures an end to a can body after the product has been placed in the can by formation of a folded double seam. An example of a double seam forming machine which secures top ends to can bodies is shown in U.S. Pat. No. 3,465,703. The disclosure of this Patent is incorporated herein by reference.

The goal of a double seam forming machine is to produce a perfect seam which extends about the circumference of every can that passes through the machine. Unfortunately this is not always possible. Undesirable conditions may occur due to defects in either the can body or the can end. Such defects may include undesirable variances in dimensions in which the ends do not perfectly "fit" the can bodies. Variations in metal thicknesses may also occur which impacts the ability to form a proper double seam.

Other conditions which may cause imperfect seams include cracks or tears in the can bodies or can ends. Such defects may result in loose or open spaces in the seam. Similarly, defective manufacture of the ends or bodies may result in folds or areas having excessive metal thickness. Such defects in the area of the seam also prevent proper seam formation.

Defects in the chucks or rolls which are used to form the seams can also result in defective can seams. Such defects may include the accumulation of metal on a chuck or roll. The accumulated material causes irregularity in the tooling surface in contact with a seam as it is being formed and can result in an improper seam. Alternatively the-chucks or rolls used to form the seam may crack, producing a gap. The seam is not properly formed in the area of the gap which results in improper can closure.

Double seam can closing machines generally include several stations where cans are formed. They include multiple associated sets of chucks and rolls which perform the same operations. If a tooling problem occurs at one chuck or roll, it will not be readily apparent because only cans that have been acted upon by the defective tooling will exhibit an improper seam. Double seam forming machines typically operate at very high production rates. It is therefore difficult to detect a problem as soon as it occurs. Hundreds or thousands of cans that are potentially defective could be closed before a problem is noticed.

In an effort to improve the inspection of can seams produced by a double seam can closing machine, others have developed devices to monitor seam quality. An example of such a device is shown in U.S. Pat. No. 4,600,347, the disclosure of which is incorporated herein by reference. This Patent discloses a modification to a standard can closing machine in which force sensors are installed on a stationary cam. Cam followers move around the stationary cam in engaged relation therewith. The cam followers are in connection with the rolls which contact the can ends and chucks which form double seams. The contour of the cam moves the cam followers, which in turn move the rolls to form the seams.

In the prior art device the sensors on the stationary cam detect the force applied by the cam followers during the final ironing turn of the can seam before the can leaves the machine. The force applied to the stationary cam by each cam follower during this operation corresponds to the configuration of the formed can seam about its circumference. The prior art device works on the principle that by monitoring the force applied by the cam follower for each station as it performs the final ironing turn on the seam, certain defects can be identified. Common defects include situations where the seam is either too tight or too loose. Such defects may arise in the form of a consistently high or low force or a transient force "spike". A high transient force spike indicates excessive metal on either the can seam, forming roll or a tooling chuck. Alternatively, a transient low spike may be indicative of a cracked tooling roll or chuck, or a gap or tear in a can seam.

While the device shown in U.S. Pat. No. 4,600,347 represents a significant advance in the detection of seaming problems, it suffers from several drawbacks. These drawbacks include the fact that double seam forming can closing machines generally include many stations. The tooling associated with each can closing station is somewhat different. This results in variation of the force that is applied by each cam follower as it moves across the force-sensing portion of the stationary cam. As a result, the amount of force associated with a "good" seam in different stations can vary significantly. The prior art devices cannot account for this variation in normal loading between the various machine stations. Rather, the prior art generally compares the applied seam force to a single high limit or low limit for all the stations. These limits must have a range that accommodates the force at all machine stations. An improper fault indication may result if the limits are set too narrowly. However, if the limits are set too widely then defective cans may be allowed to pass.

A further drawback associated with the prior art is that force variations that result from excess metal or a broken seam or chuck, are only detected if the corresponding spike is sufficiently "high" or "low" to extend beyond the limits which are established for a tight or a loose seam. Spikes or breaks that occur within the limits may be indicative of a developing tooling problem and/or have adverse consequences for the seam. However, in the prior art such conditions may go undetected.

A further drawback associated with the prior art is that developing problems with tooling, can bodies and can ends often go undetected until one of the limits is exceeded. Dimensional changes in the seam may begin moving the seam tolerances toward a limit. Such movement of seam conditions away from the optimum, increases the risk of seam failure. It may be advisable to correct such problems before they result in a fault condition. Unfortunately because the prior art devices cannot account for variations from station to station, such trends are difficult to detect.

Can seamers usually run at high speeds. As a result if a single can exhibits a fault condition, it is necessary to either shut the machine down or to locate the defective can among a large population of good cans. Stopping the machine delays production which increases costs and requires a set-up person's attention for restart. Alternatively, not shutting the machine down while attempting to locate the can that is defective may be very time consuming. Visual inspection often may not readily distinguish a defective can which further complicates the problem.

A further drawback associated with the prior art systems is that they may be subject to false triggering. Vibration or other conditions may result in short-term "noise" from the sensors on the stationary cam. This noise may produce a signal which falls outside the high and low limits, which causes a fault indication to be given. Considerable effort may then be expended in an effort to locate a problem that does not exist.

A further drawback associated with such prior art systems is the time necessary to set up the system. Generally such set-up requires the observation of sensor output signals produced by a number of cans with good seams. These seam "profiles" must be observed and documented for each of the several stations of the machine. This task is complicated by the fact that sensor signals for a good seam can vary from station to station as previously discussed. Once the various seam profiles and force levels have been studied for a number of good cans passing through each of the stations, it is then necessary to set the high and low limit values at levels sufficient to accommodate the variation in force applied by the cam followers for numerous seams. The high and low limits must be set far enough apart so that frequent false indications are not given. This process of observing seam profiles for numerous documented good seams at each of the numerous stations on the double seam forming machine is time consuming.

A further drawback associated with the prior art systems is that the instrumented portion of the cam is ideally relatively flexible compared to other portions of the cam. This is done for example as shown in U.S. Pat. No. 4,600,347 by providing a slit which extends radially between the instrumented portion of the cam and the main portion of the cam body. This enables the instrumented portion to more readily deform. An indication of the applied force is obtained using strain gage type sensors.

Making the instrumented portion of the cam more flexible also reduces its strength. There is a risk that the instrumented cam portion may fracture or take on a permanent set due to the application of excessive force. Such excessive force may result from a situation where additional metal is present on a can, roll or chuck. Damage to the cam generally necessitates cam replacement. This is costly and time consuming. Further costs may be associated with production downtime.

Thus there exists a need for a double seam forming apparatus which overcomes the drawbacks associated with prior art systems and which is reliable and economical.

DISCLOSURE OF INVENTION

It is an object of the present invention to provide a double seam forming apparatus for applying end units to can bodies.

It is a further object of the present invention to provide a double seam forming apparatus which identifies defective can seams.

It is a further object of the present invention to provide a double seam forming apparatus that identifies particular fault conditions of a formed seam.

It is a further object of the present invention to provide a double seam forming apparatus that minimizes the risk of false fault indications.

It is a further object of the present invention to provide a double seam forming apparatus that monitors seam conditions and accounts for variations in tooling at the stations of a multi-station machine.

It is a further object of the present invention to provide a double seam forming apparatus that identifies seam imperfections even when such imperfections do not place the seam parameters outside of acceptable limits.

It is a further object of the present invention to provide a double seam forming apparatus that can be used to identify trends in seam characteristics.

It is a further object of the present invention to provide a double seam forming apparatus that can reject cans with defective seams without having to stop the operation of the apparatus.

It is a further object of the present invention to provide a double seam forming apparatus that has reduced set-up time compared to prior devices.

It is a further object of the present invention to provide a double seam forming apparatus that reduces the risk of cam failure.

It is a further object of the present invention to provide a double seam forming apparatus that is reliable and economical to operate.

Further objects of the present invention will be made apparent in the following Best Modes For Carrying Out Invention and the appended claims.

The foregoing objects are accomplished and a preferred embodiment of the invention by a double seam forming apparatus that secures and seals end units to can bodies through the formation of a double seam. These end units are generally top ends which are applied after a product has been placed in the can. Alternatively the present invention may be used in connection with the application of bottom ends which are seamed prior to placing product in the can.

The apparatus includes a cam with at least one seaming track. The seaming track includes a high dwell portion. Cam followers in operative connection with seam forming rolls and chucks engage the high dwell portion as cans undergo a final ironing turn to form the double seam.

A sensor is mounted in operative connection with the high dwell portion of the seaming track of the cam. The sensor operates to generate signals responsive to the force applied by cam followers which cause slight deformation of the cam as they move across the high dwell portion. The force applied by each cam follower on the high dwell portion is representative of the force applied by the cam forming roll and chuck to the circumferential can seam that is formed while in engaged relation therewith.

The apparatus of the preferred form of the present invention includes a cam body which is relatively rigid compared to the instrumented portion of the cam. An extending portion of the cam body engages the high dwell portion with the cam body responsive to the high dwell portion approaching its maximum permissible deflection. This might occur in a fault situation. The extending portion provides reinforcement and reduces the risk of the high dwell portion permanently deforming or fracturing.

The apparatus of the invention includes a monitoring apparatus or system. The monitoring system is in operative connection with the sensor. The monitoring system has a sampling portion that operates to sample sensor signals at a plurality of locations as the cam follower moves across the high dwell portion of the cam. This is done for the cam follower associated with each station as each can seam undergoes its final ironing turn.

The monitor system further includes a data generating portion which is operative to produce a plurality of data elements representative of a can seam profile. In a preferred form of the invention the data elements are generated by a base line reference generating portion included in the data generating portion. The base line reference generating portion subtracts from each sensed value a corresponding value in a base line profile, which base line profile is established and stored in a memory during set-up of the system. In the preferred embodiment, a can which has a seam which does not vary significantly from the base line profile produces a can seam profile that is represented by a generally straight line and which does not deviate significantly from the base line profile.

The monitoring system of the apparatus in the preferred embodiment also has an averaging portion that operates to average all the data elements that are calculated for each can seam. This average is compared to a plurality of stored threshold values. In a preferred embodiment this average is compared to threshold values stored in a limit storage portion of the monitor system, which stored values correspond to a tight fault condition, a tight warning condition, a loose fault condition and a loose warning condition. Can seam data for each can is stored in a database along with an indication of any threshold values that are crossed. Crossing threshold values for fault conditions causes a signal generating portion of the monitoring system to set a flag associated with the can identified as having a defective seam.

The monitoring system further includes a comparator portion which is operable to compare each of the data elements for the particular seam to the average of all the data elements for that seam. Variation of a particular data element above the average by more than a high set threshold amount may be indicative of high transient force associated with excess metal on a chuck, roll, or seam. Likewise, variation of a data element from the average below a set low threshold amount may be indicative of a broken seam, roll or chuck. If such a high or low variation from average is encountered a discriminating portion of the monitoring system operates to compare a number of adjacent data elements in the seam profile to verify that such condition existed for a sufficient time so as to be representative of an excess metal or broken condition rather than a transient noise signal. Upon identifying a metal or broken condition the signal generating portion the monitor system of the apparatus flags the can as having a defective condition.

The preferred embodiment of the invention further includes a feed sensor for sensing when cans are delivered to a station of the apparatus. If no can is delivered to a station a disregarding portion of the monitoring system is operative to disregard sensor readings from that station when its associated cam follower passes over the instrumented cam portion.

The preferred form of the invention also includes a reject portion which is operative to divert cans that have been flagged because they exhibit a fault condition. The reject portion is operative to divert such cans after they have passed through the machine so as to segregate defective cans from good cans without having to shut down the apparatus.

BRIEF DESCRIPTION OF DRAWINGS

FIG. 24 is a screen display of the host station showing seam history for the six station embodiment.

BEST MODES FOR CARRYING OUT INVENTION

Figure 1:
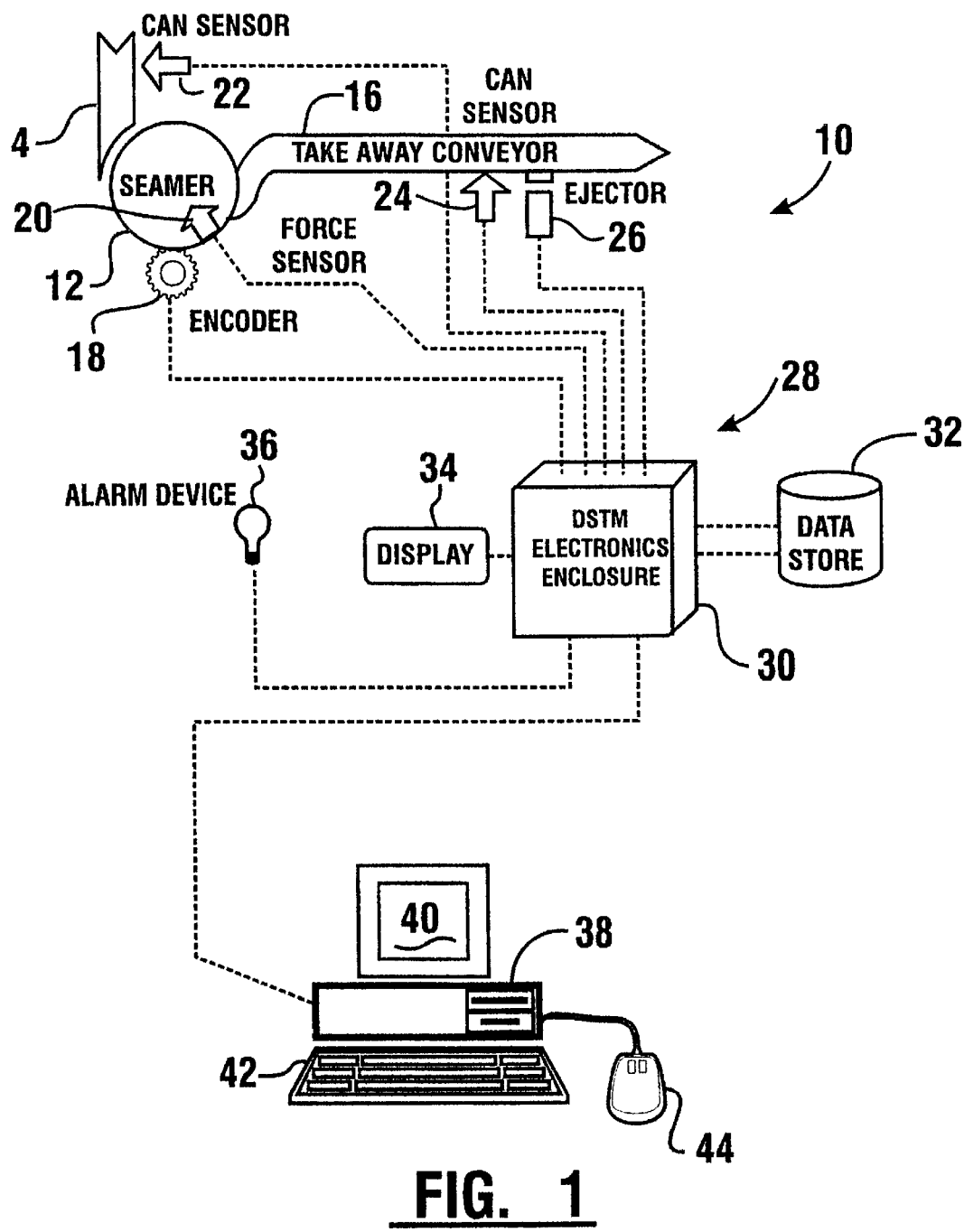
FIG. 1 is a schematic view of a seam forming apparatus of the present invention.

Referring now to the drawings and particularly to FIG. 1, there is shown therein a schematic view of an embodiment of the apparatus of the present invention generally indicated 10. The apparatus includes a double seam forming can seamer 12. In the preferred form of the invention seamer 12 is of the type that attaches can ends on to can bodies through formation of a hermetic folded double seam. The seamer may be of a type shown in U.S. Pat. No. 3,465,703 which performs first and second seaming operations to form a circumferential seam. The seamer preferably includes a plurality of stations. For purposes of this illustrative embodiment the seamer includes six (6) stations. Of course, seamers with different numbers of stations may alternatively be used.

The apparatus 10 is in operative connection with a feed conveyor 14. Feed conveyor 14 feeds open can bodies preferably containing a product to seamer 12. A take-away conveyer 16 carries away the cans upon which the ends have been installed.

An encoder schematically indicated 18 is in operative connection with the seamer. In the preferred form of the invention, encoder 18 is an optical encoder which is in connection with a timing shaft of the seamer. The optical encoder in the preferred form of the invention used with the six station seamer provides 2,400 evenly spaced pulses per rotation of the timing shaft. The encoder also provides an initialization pulse during each rotation in accordance with conventional encoder operation. The signals from the encoder 18 enable the positions of the components of the seamer to be derived at any point in the machine cycle. Of course other types of encoders or sensors may be used to perform this function in alternative embodiments.

Seamer 12 is in operative connection with a force sensor schematically indicated 20. The force sensor 20 which is later described in detail, provides signals indicative of the force applied by can forming tooling as it makes the final ironing turn to form a can seam. The force sensor is operable to provide signals during this final forming process for each can passing through the machine.

Apparatus 10 further includes a can feed sensor 22. Can feed sensor 22 is adjacent to an area in which cans enter a station of the seamer. Can feed sensor 22 enables sensing whether a can has entered this station of the seamer. This enables determining if an end should be delivered by the seamer for placement on a can body in a particular machine station. The feed sensor also enables determining whether data should be gathered from a particular station as its associated cam follower moves across the cam portion in connection with the force sensor as later explained.

Apparatus 10 further includes a can reject sensor 24. Can reject sensor is positioned adjacent to take-away conveyor 16 and is operative to sense cans passing on the take-away conveyor. A can ejector 26 is positioned adjacent to can reject sensor 24. Can ejector 26 may be selectively operated to divert cans off of the take-away conveyor when a fault condition for a can is detected.

Apparatus 10 further includes a monitor apparatus or system generally indicated 28. Monitor system 28 includes a controller 30. Controller 30 preferably includes a processor for executing programmed instructions, as well as at least one data store schematically indicated 32. Controller 30 also has an associated display schematically indicated 34. In the preferred embodiment of the invention display 34 is a touch screen display which can be used for both input of instructions as well as output of information. Controller 30 is also in connection with at least one alarm device schematically indicated 36.

Monitor system 28 preferably further includes a host station 38. Host station 38 preferably includes a computer connected to controller 30 through a local area network. It should be understood that while only one controller connected to host station 38 is shown, a plurality of controllers and seamers may be connected to a single host station. The host station preferably includes a screen 40 for display of information. Host station 38 also includes a keyboard 42, mouse 44 or other data input device. Controller 30 communicates with host station 38 through ARC NET or other suitable field bus network communication scheme.

As schematically indicated in FIG. 1, signals from the force sensor 20, the encoder 18 and sensors 22 and 24 are delivered to the controller 30. The controller 30 is operable to control can ejector 26 and alarm device 36 in accordance with the programming of its processor. Further it should be understood that monitor system 28 in some embodiments may also be in operative connection with the motors which drive seamer 12 and/or feed conveyor 14 and takeaway conveyor 16, to shut them down in the event of certain fault conditions.

Figure 2:
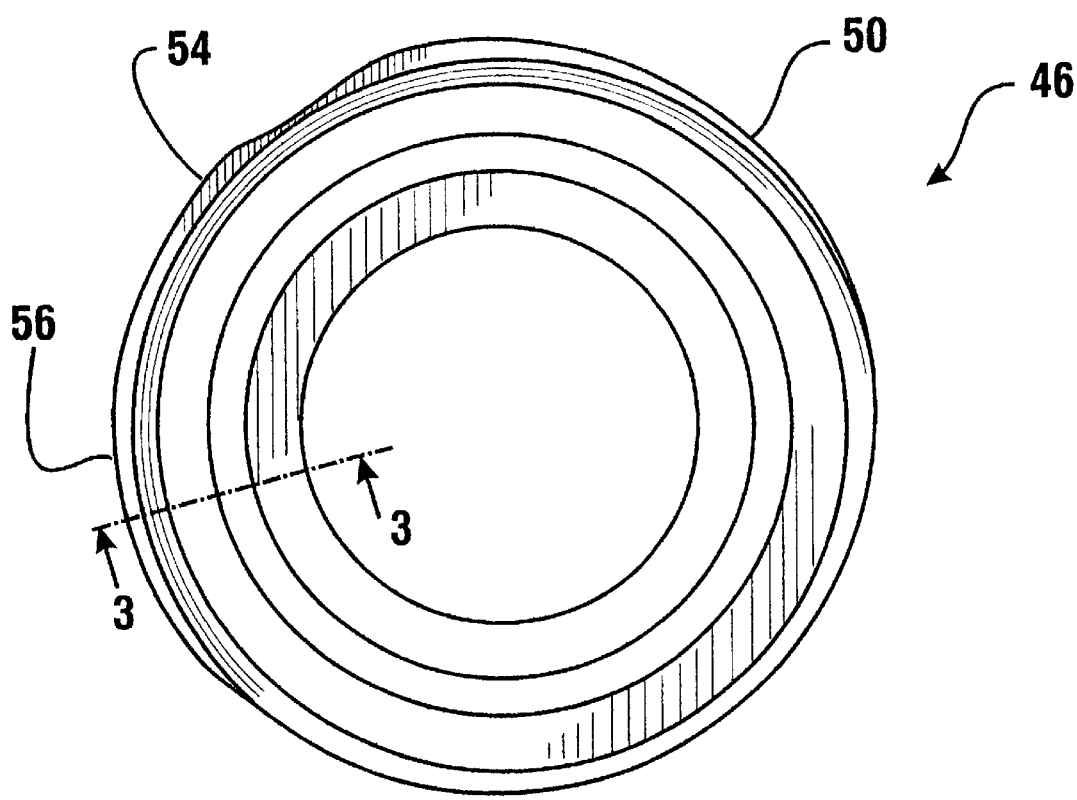
FIG. 2 is a top plan view of a stationary seaming cam of the seam forming apparatus.

FIG. 2 is a top plan view of a seaming cam 46. Seaming cam 46 is an integral part of seamer 12 and is used to control the positions of cam followers which rotate about the seaming cam 46 in engaged relation therewith. The cam followers which rotate about the cam are in connection with seam forming tooling. This tooling includes rolls and chucks which form the double seams which engage the can ends to the can bodies.

Figure 3:
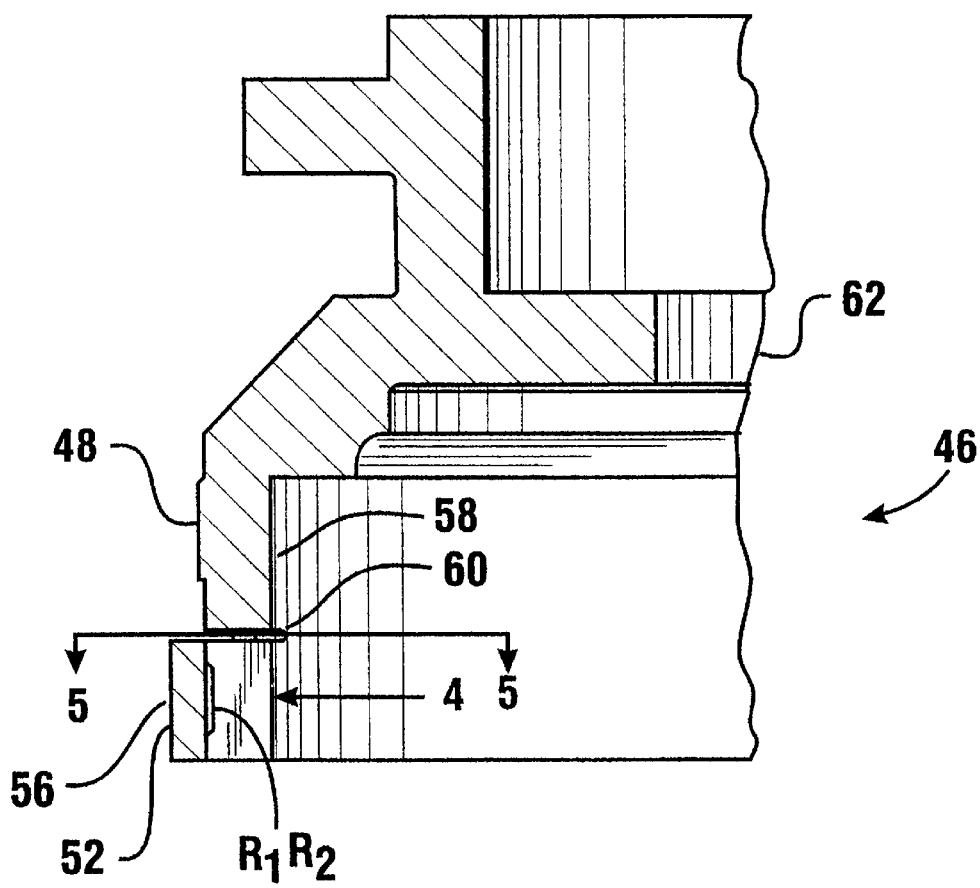
FIG. 3 is a cross-sectional view of the seaming cam along line 3-3 in FIG. 2.

As shown in FIG. 3, cam 46 includes a first operation track 48. First operation track 48 includes an outward extending lobe 50 as shown in FIG. 2 which engages cam followers which perform a first can seam forming operation. Cam 46 further includes a second operation track 52. Second operation track 52 includes a radially outward projecting lobe 54. Outward projecting lobe 54 includes a high dwell portion 56. Cam followers engaged with the high dwell portion 56 make the final ironing turn which completes the formation of the double seam. As a cam follower passes over the high dwell portion, cam 46 positions the cam follower which in turn moves a seam forming roll which forms the seam between the roll and a seaming chuck. The metal being formed applies a reaction force which is transmitted by the cam follower to the cam 46. This force is applied as the can is rotated generally about one and a quarter turn by the chuck, while the cam follower passes over the high dwell portion. The reaction force applied by the cam follower to the high dwell portion is representative of the reaction force of the seam against the seam forming tooling. Variations of this force are indicative of seam conditions which are identified by the apparatus of the present invention.

Figure 4:
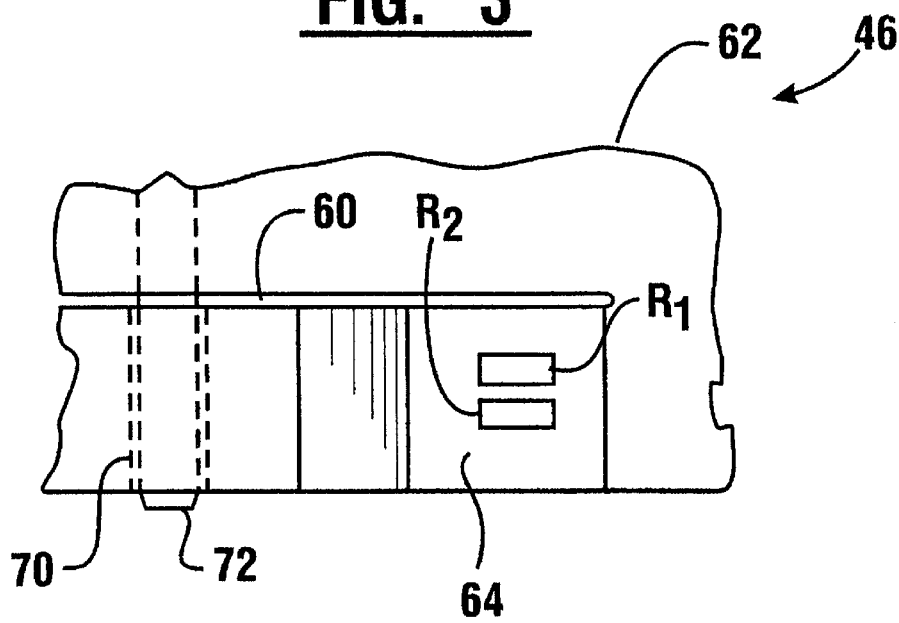
FIG. 4 is a view of an inner surface and notch of the seaming cam along arrow 4 in FIG. 3.
Figure 5:
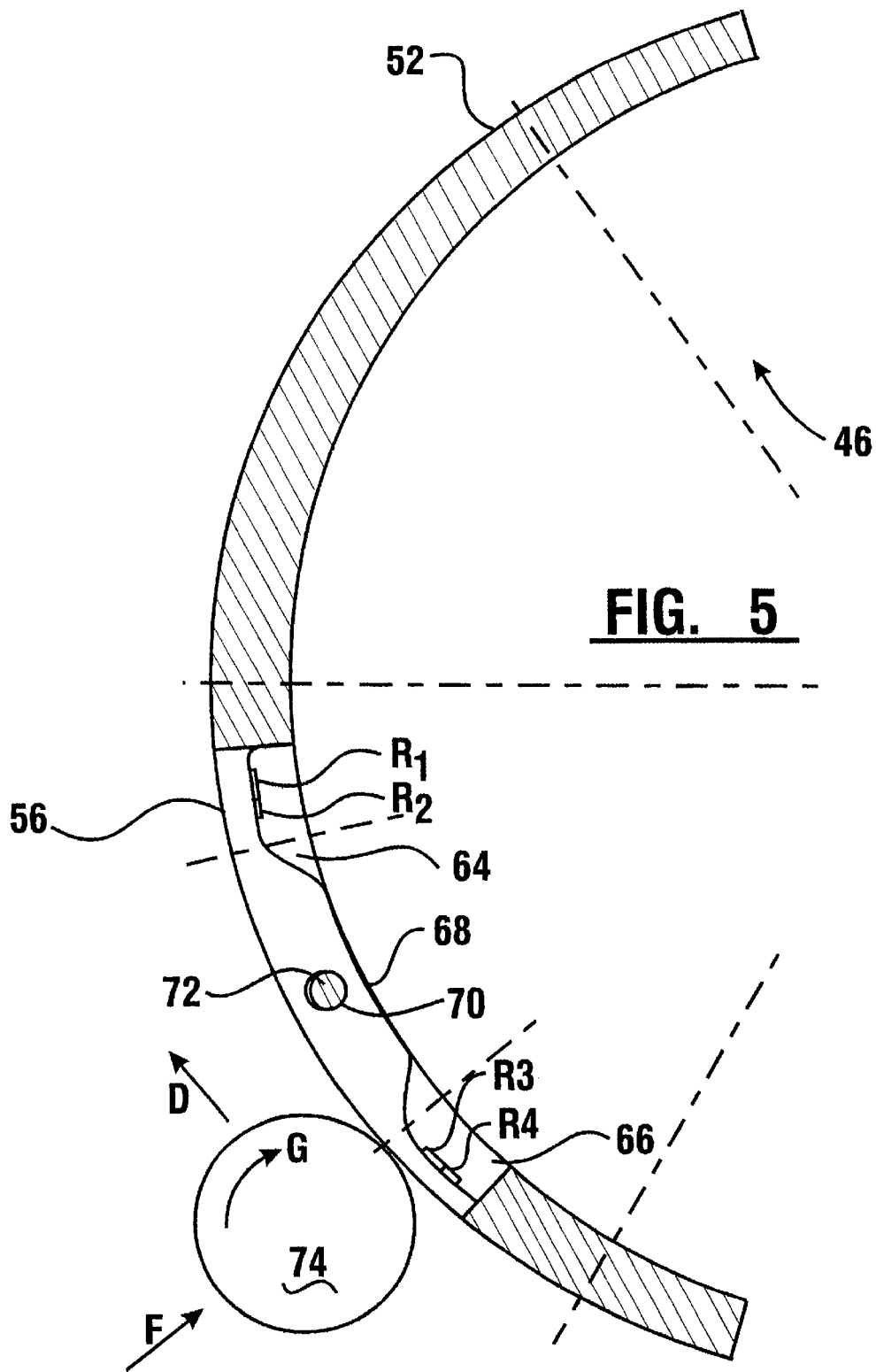
FIG. 5 is a cross-sectional view of the seaming cam taken along line 5—5 in FIG. 3 with a cam follower shown in engaged relation therewith.

As shown in FIGS. 3, 4 and 5, cam 46 has an inner surface 58. A cut or saw slit 60 extends radially outward from the inner surface 58 so as to partially separate the high dwell portion 56 from the remainder of the cam body generally indicated 62. Slit 60 enables the high dwell portion 56 of the second operation track to be more readily deformable compared to the remainder of the cam body 62.

As shown in radial cross-section in FIG. 5, the inner surface 58 is contoured in the area of the high dwell portion to include a first notch 64 and a second notch 66 which is angularly disposed from the first notch. As shown in FIGS. 4 and 5, each notch 64 and 66 has mounted therein a pair of strain gages. The strain gages, which are schematically indicated, are R1 and R2 in first notch 64 and R3 and R4 in second notch 66, are preferably positioned to extend circumferentially. The strain gages are positioned to sense deformation of the high dwell portion of the cam in the circumferential direction. While in the preferred form of the invention, conventional foil type strain gages are used, in other embodiments of the invention other sensors which sense force, or parameters which result therefrom such as strain, stress or deformation, may be used, including piezoelectric sensors.

As will be understood by those skilled in the art, in the preferred form of the invention the four strain gage resistances are incorporated into a bridge circuit of the wheatstone bridge type or comparable circuitry. Thus in this manner the resistances are combined to provide an electrical signal representative of the strain due to deformation of the high dwell portion. This is representative of the force of the cam follower on the high dwell portion which is indicative of the reaction force caused by the can seam formation. In other embodiments other instrumentation techniques for measuring force, strain, stress or deformation may be successfully used depending on the sensor type.

As best shown in FIG. 5, the interior surface of the high dwell portion of the cam also includes a radially enlarged portion 68. Enlarged portion 68 has an opening 70 extending in axial direction therethrough. A reinforcing pin 72 which is slightly smaller in diameter than opening 70 extends in the opening. Pin 72 extends from cam body 70 and across slit 60 and into opening 70. Pin 72 serves as an extending portion of the cam body which acts to limit the extent of deflection or deformation of high dwell portion 56.

As shown in FIG. 5, in operation of the invention a cam follower 74 moves across the high dwell portion 56 of the cam 46 in a direction of arrow D. As the cam follower moves it rotates in engagement with cam 46 in a direction of arrow G. The force transmitted by the cam follower from the can seam is directed radially inward against cam 46 as indicated by arrow F.

Because the force represented by arrow F is directed radially inward against the relatively deformable high dwell portion of the cam, it is possible that a malfunction may result in excessive force against the high dwell portion. To prevent such excessive force from causing the high dwell portion to fracture or permanently deform, extending pin 72 serves to engage the wall bounding opening 70 when high dwell portion 56 deforms inwardly a maximum safe permissible amount. The engagement of pin 72 with the wall bounding opening 70 serves to provide additional strength to the high dwell portion to prevent it from taking on a permanent inward set or otherwise being damaged due to excessively high forces.

Although not shown in FIGS. 3, 4 and 5, it will be understood by those skilled in the art that suitable flexible coating materials or other sealing materials may be applied to the area of the slit 60 and the opening 70 to minimize the infiltration of dirt and other contaminants into those areas. The avoidance of such contaminants insures that these portions are relatively movable and perform their functions in a repeatable manner.

As shown in FIG. 1, controller 30 is in operative connection with the strain gage resistances which comprise sensor 20. Controller 30 is also in operative connection with encoder 18. The encoder provides signals which are synchronized with the position of each cam follower 74. It can be determined that the cam follower associated with a particular station of the seamer 12 engages the high dwell portion of cam during each machine cycle, a certain number of pulses or counts after the point where the encoder gives its "0" or initialization pulse. Likewise, for the same cam follower, a number of pulses corresponding to the location where the cam follower disengages from the high dwell portion can be determined. By programming this information in the monitor system 28, signals from the force sensor 20 which are generated as a particular station cam follower passes over the high dwell portion, can be identified as data from that can forming station.

The range of pulses or counts for the cam follower associated with each machine station can be readily determined during set-up of the apparatus. This enables sensor data associated with each seaming station to be identified. This is preferably accomplished during set-up by programming this information in the controller 30.

The encoder 18 also preferably produces pulses at the same physical location of a cam follower each time the cam follower moves across the cam 46. The apparatus preferably operates to sample the signal from the force sensor 20 responsive to generation of each encoder pulse. This enables the controller 30 to generate signals corresponding to the force applied by a cam follower associated with a particular station in a number of physical locations as the cam follower moves across the high dwell portion. This data which shows how seaming force varies with time as the cam follower moves across the high dwell portion, is referred to as a can seam profile. By storing this data in the data store 32, the controller is enabled to accumulate a large number of sensor readings for the same locations associated with a cam follower for a given station.

This ability of the apparatus of the present invention to store data associated with particular seaming stations, enables establishment of a base line profile for each seaming station. The base line profile is representative of data for a number of good seams formed in one particular station. To establish the base line profile, the processor in controller 30 executes a computer program which preferably includes the program steps schematically indicated in the flow chart in FIG. 27.

Figure 27:
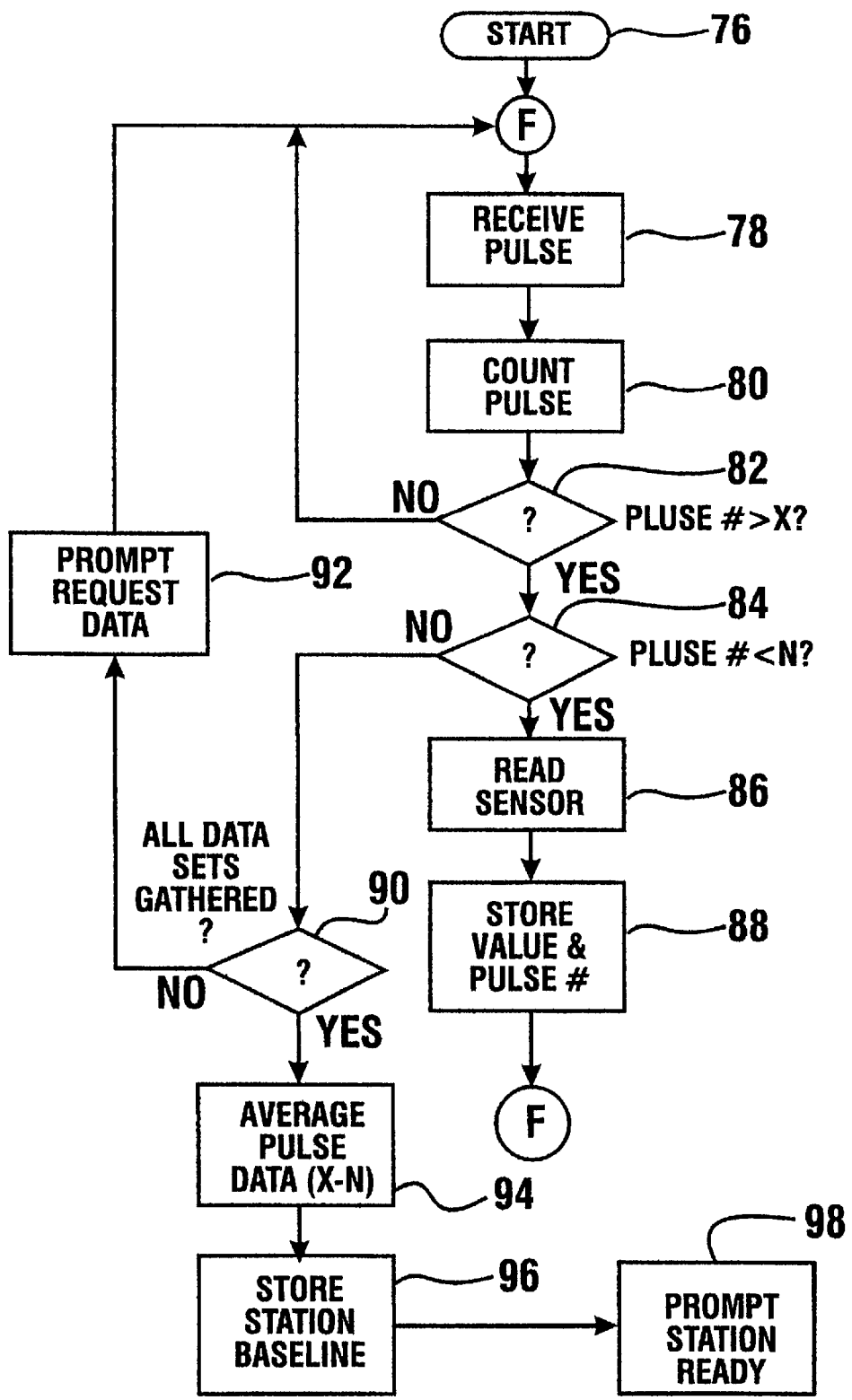
FIG. 27 is a flow chart of process steps executed by a processor of the monitoring system portion of the apparatus for developing a base line profile for a can seamer station.

To establish the base line profile, a set-up person conducting the set-up of the machine, first determines the range of pulses that correspond to the cam follower for the station of interest passing across the high dwell portion. These can be determined through calculation or by observation through movement of the seamer components. For purposes of FIG. 27, the starting pulse of interest is indicated as "X" and the ending pulse is indicated as "N." Although FIG. 27 shows the calculation of the base line profile for only a single station, it should be understood that the controller is preferably used to establish base line profiles for all the stations simultaneously in a similar manner. This is done by establishing the encoder count range for the time in the machine cycle when each of the seamer stations has its cam follower in engagement with the high dwell portion of cam 46.

To establish the base line profile, a plurality of sample cans having "good" seams are gathered. Good seams are identified in a conventional manner based on the criteria for the particular type of can being formed in seamer 12. A good can is manually placed in the station of interest in the can seamer, and the seamer is started as indicated by a step 76. As the seamer runs, pulses are received by the controller 30 at a step 78, and the pulses are counted from the initialization pulse at a step 80. The controller then executes steps 82 and 84 to determine if the pulses generated by the encoder correspond to the location of the cam follower in engagement with high dwell portion for the station of interest. If the pulses from the encoder correspond to the range of interest (between X and N), the controller 30 operates to sample the sensor signal at each pulse of the encoder at a step 86 and to store the corresponding data in connection with the pulse number in an array in the database in a step 88. As indicated in steps 82 and 84, data corresponding to the pulses outside the station of interest are disregarded for purposes of calculating the base line profile for this station.

Controller 30 is preferably programmed to require a certain number of data sets associated with good cans passing through the particular station in order to calculate the base line profile. Using a larger number of good cans increases the amount of data on which the base line profile is based. For many types of cans at least a dozen good cans may be used but the actual number may depend on the circumstances. After each good can is run, controller 30 executes a step 90 to determine if the number of good cans passed through the station has reached the value programmed for determination of the base line profile. If it has not, the controller 30 prompts entry of a further can at a step 92. The prompting may be done at display 34 or on screen 40 of the host station 38 or both. In response to such prompting the process is repeated with another good can.

The process of taking data with known good seams passing through the station is repeated until the predetermined number of data sets is reached. At this point there is an array of data stored in the controller. The controller 30 then executes a step 94 to average each set of sensor readings associated with a particular numbered data pulse in the array. By averaging the set of values associated with each data pulse, a value corresponding to an average force on the cam is obtained for a given location of the cam follower as it moves across the high dwell portion. This averaging is done for each set of sampled sensor values corresponding to a particular data pulse in storage. Once all the data has been averaged the controller 30 operates to store in a data store the base line profile values for the particular station at a step 96. The base line profile thus represents the average sensor reading for good cans at each physical location where an encoder pulse is generated as the cam follower moves across the high dwell portion. Once the base line profile for the particular station is stored, the controller 30 indicates that the base line data is stored at a step 98.

It should be understood that controller 30 contains additional circuitry for obtaining readings from the force sensor. In the case of the strain gage type sensors discussed, the controller 30 contains appropriate circuitry for the wheatstone bridge and to amplify the signal. The amplifier is also combined with a filter to attenuate signals that have frequencies that are outside the range of interest. Further, the force sensor is also connected to an analog to digital (A/D) converter, which converts the sensor signal to a digital signal. This facilitates storing and processing sensor reading values. The required controller circuitry will depend on the particular type of force or other sensors used.

In the preferred form of the invention the monitor system is also calibrated to provide an indication of the level of force which is being applied by the cam followers to the high dwell portion of the cam. This is accomplished by applying a known force in generally centered relation on the high dwell portion. This can be done using a hydraulic ram or other suitable device which enables the application of a known applied force. In the preferred form of the invention the applied force for calibration purposes is 453.5 Kg. (1000 pounds). This value is used because it is generally the average level of force applied by the cam followers in the high dwell portion in an exemplary embodiment. Of course, in other embodiments the normal level of application force may be determined from the base line profile data.

In the preferred form of the invention the sensor output is calibrated to applied force by varying the known force applied to the high dwell portion of the cam. By obtaining at least two sensor signals for two known force levels, the controller 30 is programmed to interpolate and extrapolate from these points to provide an indication of the force level reading. Preferably, several known force readings are applied during set-up and the controller executes a programmed routine which provides a corresponding force level in kilograms, pounds or other units for a given force acting on the high dwell portion of the cam.

It will be recognized by those skilled in the art that because the high dwell portion of the cam comprises an arcuate range of angular positions, calibration of a force in kilograms or pounds must necessarily be done by applying known forces at only one location. Because the cam follower moves throughout the high dwell portion, the corresponding output in kilograms or pounds must necessarily be a relative reading and does not represent with absolute accuracy the force applied at a particular point away from the location of the calibration force. Nonetheless, the ability to express the cam follower force in pounds or other units is very useful.

Figure 7:
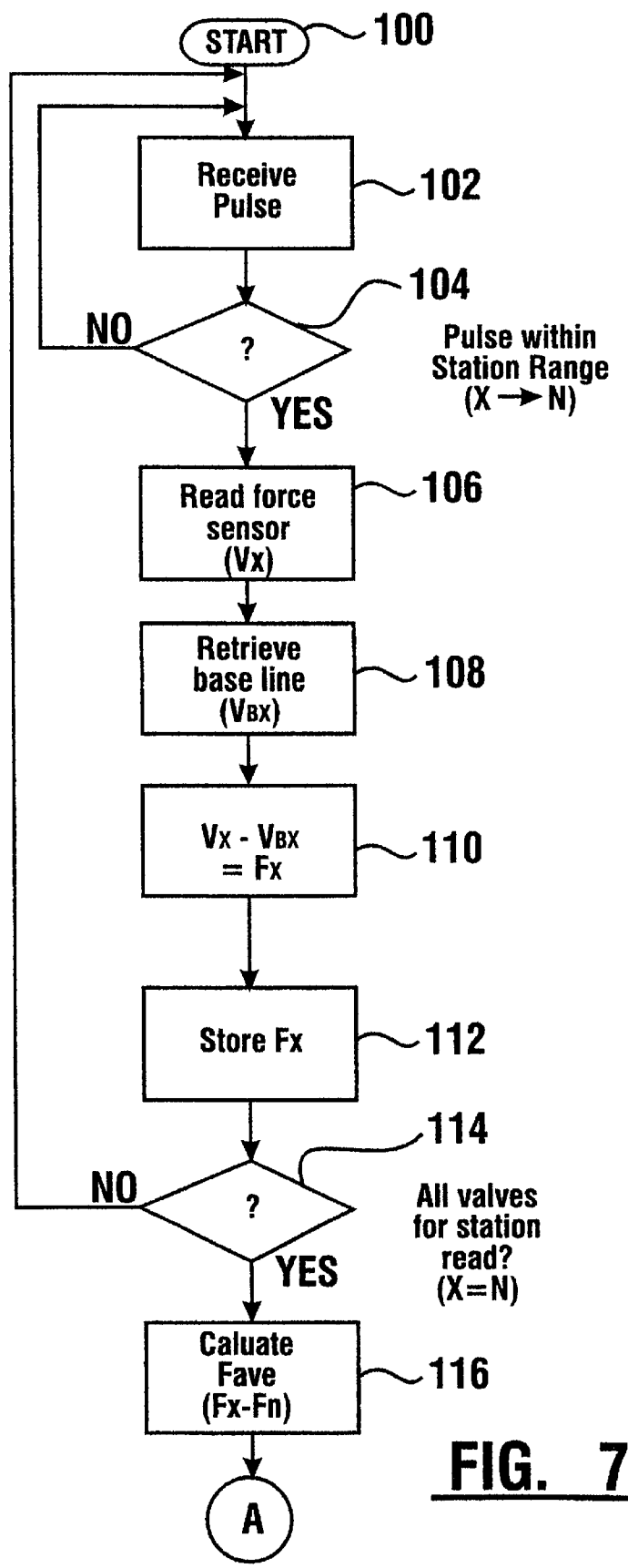
FIGS. 7 through 10 are a flow chart of process steps executed by a processor in an embodiment of the apparatus.

Once the high dwell portion of the cam has been calibrated, the setup person sends cans having known undesirable conditions through the seamer 12 and observes the levels of cam force encountered. The observation of the particular can conditions is facilitated by the controller executing the program steps which are schematically represented by the flow chart in FIG. 7. FIG. 7 shows the generation of a can seam profile for a particular station of the seamer through which a can is passing. From the start point 100 the controller receives an encoder pulse at step 102 and then determines if the pulse corresponds to the station of interest at a step 104. If the pulse is within the station range the controller 30 operates to read or sample the force signal generated from the force sensor at a step 106. The controller further operates to retrieve the base line profile data element corresponding to that encoder position from memory in a step 108. The controller then operates to subtract the base line profile value from the sampled sensor value at a step 110 to produce a data element. The controller then stores each data element for each encoder position at a step 112. Then at a step 114 the controller determines if all the values for that station have been read and stored. If all the data elements have been calculated the controller then executes a step 116 to calculate an average of all the data element values for the set associated with that particular can seam.

Figure 11:
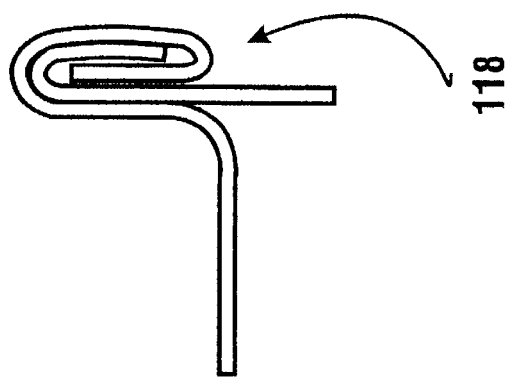
FIG. 11 is a cross-sectional view of a normal double seam produced by the apparatus of the present invention.
Figure 12:
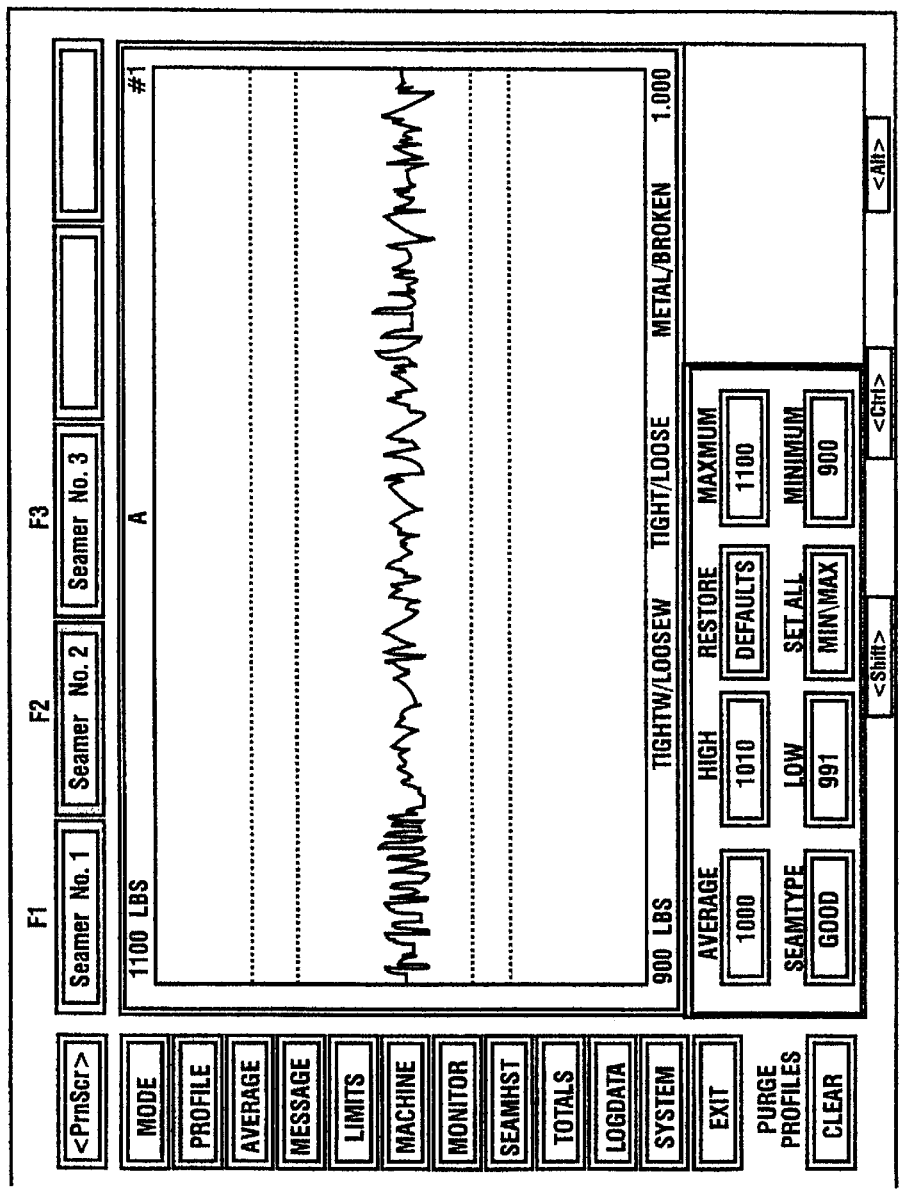
FIG. 12 is a screen display of the host station showing an output representative of a seam force profile corresponding to the normal seam shown in FIG. 11.

The execution of this process by the controller 30 provides a fundamental advantage of the invention. This advantage is that although the force applied to the high dwell portion 56 of the cam 46 may vary substantially for the different positions of the cam follower, the subtraction of the base line profile data generates output data which is generally linear if the seam is a good seam. This is graphically represented in FIGS. 11 and 12. FIG. 11 shows a cross sectional profile of a good double seam generally indicated 118. FIG. 12 shows a screen display 120 corresponding to seam 118. In screen display 120 the data elements derived by the controller for the particular station of interest are shown as a jagged line at the center of the screen. This line shows that although the data elements vary, the overall layout of the data elements is generally linear. This facilitates the identification of irregular seams electronically much more readily than would otherwise be possible because force values from sensor 20 in their unmodified form are often generally non-linear.

Although the preferred embodiment subtracts the respective base line profile from the can seam profile, alternative forms of the invention may reduce the base line profile by the can seam profile, or otherwise analyze or display the differences between the profiles. The difference between the profiles is useful in identifying irregularities.

The ability of monitor system 28 to output data representative a seam profile as a generally linear function also facilitates the establishment of a plurality of force levels at which fault and other conditions are to be indicated. Further, because the output of the sensor and the resulting displays are calibrated in pounds it enables setting levels for these threshold values in pounds.

In the preferred form of the invention the establishment of such threshold values is preferably done by running cans with known undesirable characteristics through the various stations of the seamer and observing the outputs. Thus, the threshold value at which a tight seam fault should be indicated can be determined experimentally. Determining this is facilitated in the preferred form of the present invention because a can having a particular fault condition may be run through each of the stations of the seamer and the force levels viewed with reference to the base line profile that has been calculated for that particular station. As a result, a "high fault" level can be set which is appropriate for all the stations. Similarly the same can be done to establish a "loose fault" level.

A further fundamental advantage of the invention relative to the prior art is that the present invention enables the establishment of intermediate threshold values which may not be sufficiently tight or loose so as to constitute a fault condition, but which sufficiently vary from the base line profiles so as to warrant review and analysis. This enables the observation of trends which may be tending towards a fault condition. As a result, the operator of the system can correct such trends before they result in a fault condition.

Figure 6:
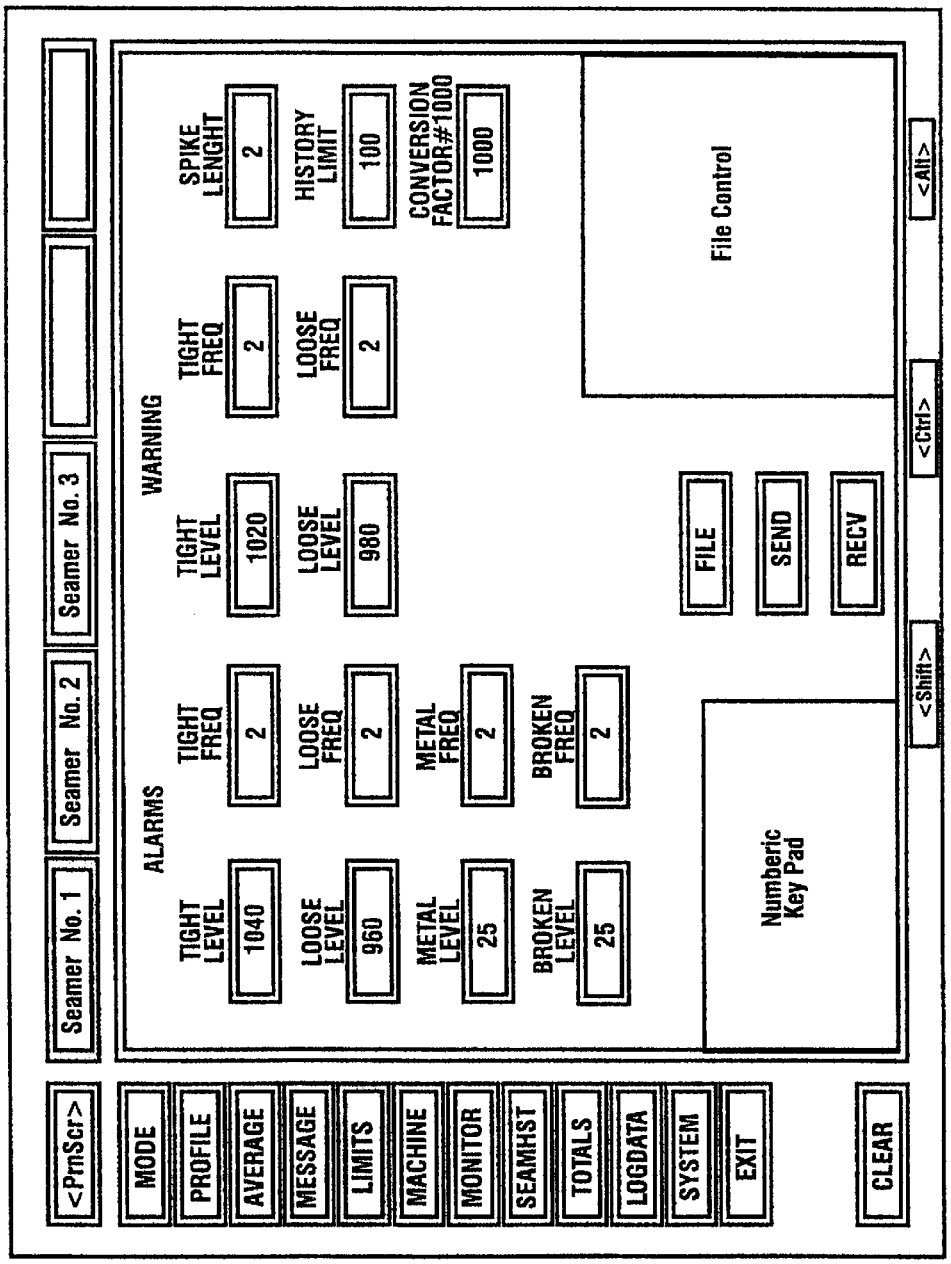
FIG. 6 is a screen display of a host station of the present invention indicating threshold value limits that have been set up for seam parameters which are monitored during operation of the apparatus.

FIG. 6 shows a screen display of host station 38 upon which fault and warning threshold values have been set. Screen display 122 shows a "tight level" alarm or fault condition threshold value set at 471.66 Kg. (displayed as 1040 pounds). Correspondingly a loose level alarm or fault threshold value is indicated at 435.37 Kg. (960 pounds). A tight level warning threshold value is set at 462.58 Kg. (1020 pounds) and a loose level warning threshold value is set at 444.44 Kg. (980 pounds). Of course it should be understood that these levels are determined for the particular circumstances by experimentation and set by a set up person at the controller 30 or host station 38.

Figure 8:
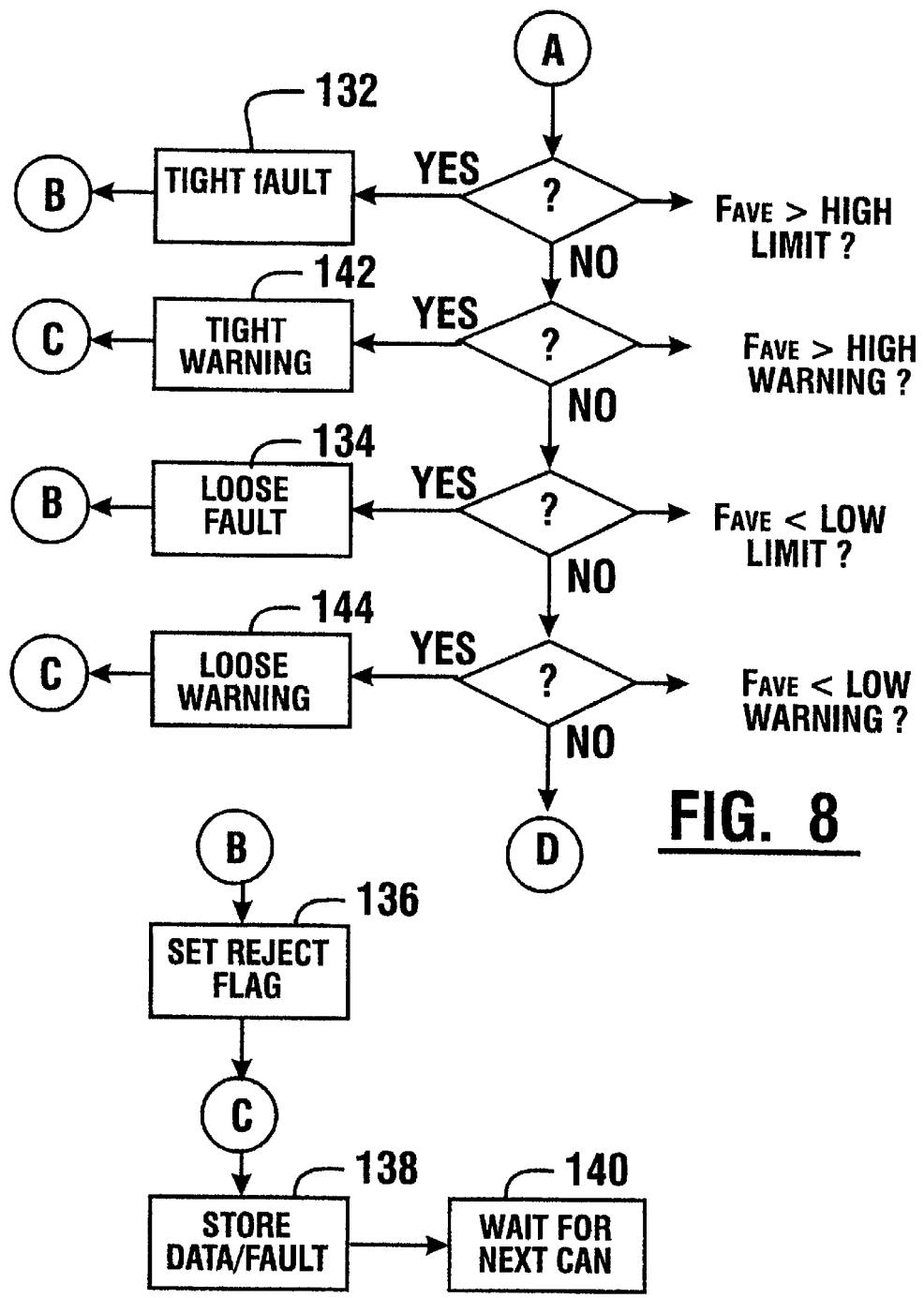
Figure 10:
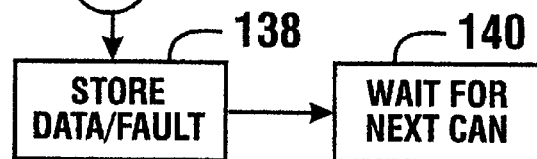

A computer program executed by the processor in controller 30 includes the process steps schematically indicated in FIG. 8. The computer program is operative to test for a fault condition at a particular machine station after the controller has executed the portion of the program shown in FIG. 7. The program compares the calculated average force to the high limit threshold value at a step 124. If the average calculated value is below the high limit, the controller then checks to determine if the value is above the high warning threshold value at a step 126. If not, the controller then checks if the average value is below the low limit threshold value at a step 128. If the average value is not below the low limit, it is then checked to determine if the average value is below the low warning threshold value at a step 130. If a tight fault is found a tight fault indication is given at a step 132. Likewise if the average value is below the low limit, a loose fault is indicated at a step 134. In response to either of these fault conditions the controller operates to set a reject flag at a step 136 as shown in FIG. 10. As later explained, the setting of a reject flag is used by the reject portion to divert defective cans from the takeaway conveyor 16.

Once a reject flag is set, the data concerning the force level is stored along with the fault indication in the data store 32 at a step 138. The system then waits for the next can at the station at a step 140.

If a tight fault is not found but the value is above the tight warning limit, the controller 30 then executes a step 142 to give a tight warning indication. Similarly, if the seam value is in the range where a loose warning is to be given the controller 30 executes a step 144 to provide the loose warning indication. In either of these conditions the controller executes step 138 to store the seam force data as well as the warning indication in the data store 32 for future retrieval.

Figure 13:
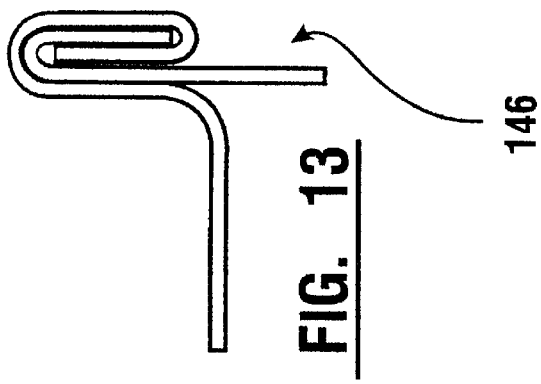
FIG. 13 is a cross-sectional view of a tight seam.
Figure 14:
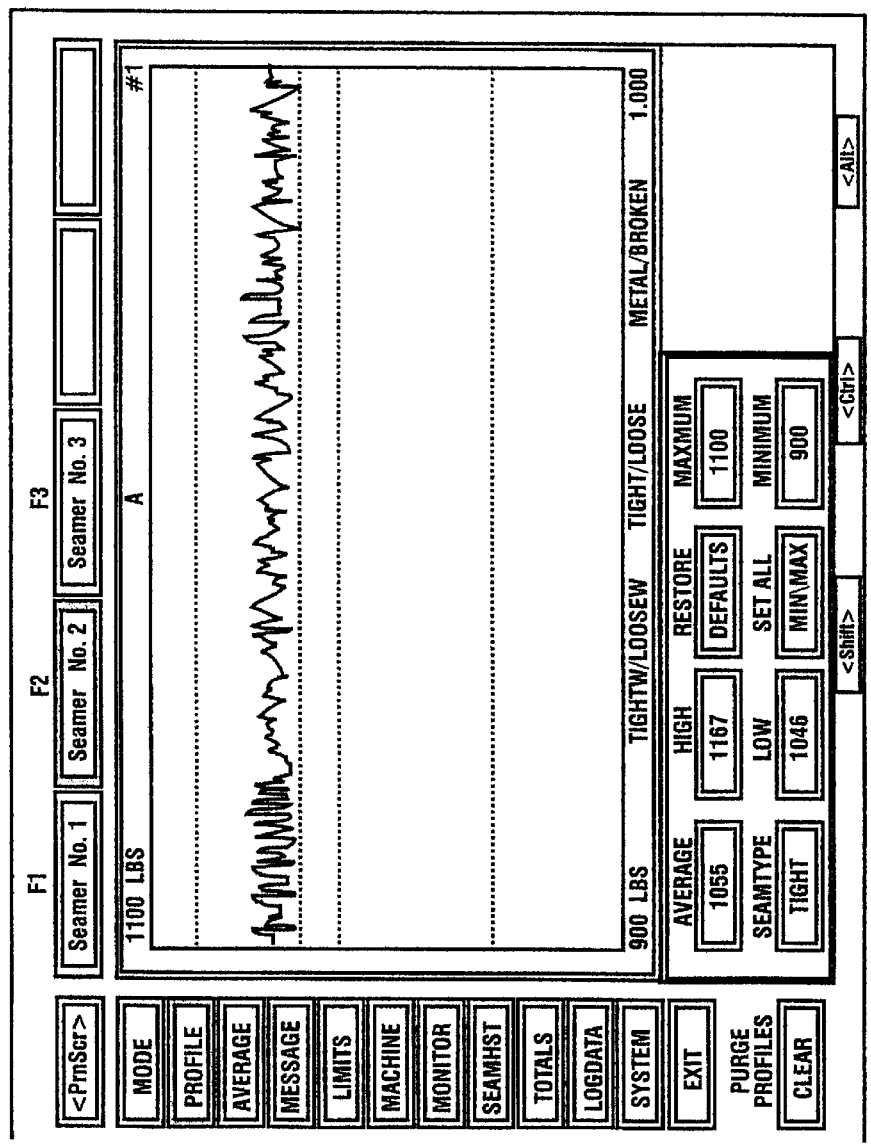
FIG. 14 is a screen display of the host station corresponding to the tight seam shown in FIG. 13.

A typical example of an undesirable tight can seam is indicated 146 in FIG. 13. Such a tight seam 146 produces a seam profile on screen display of the host station of the type 148 shown in FIG. 14. As indicated in FIG. 14, the average value of the data elements which comprise the seam profile for tight seam 146 is above the high level tight alarm limit threshold value. For this reason controller 30 operates when such a seam is encountered to indicate a tight fault and to set a reject flag as indicated in FIG. 8.

Figure 15:
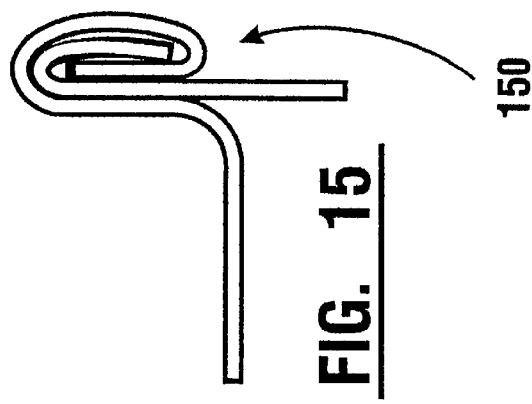
FIG. 15 is a cross-sectional view of a loose seam.
Figure 16:
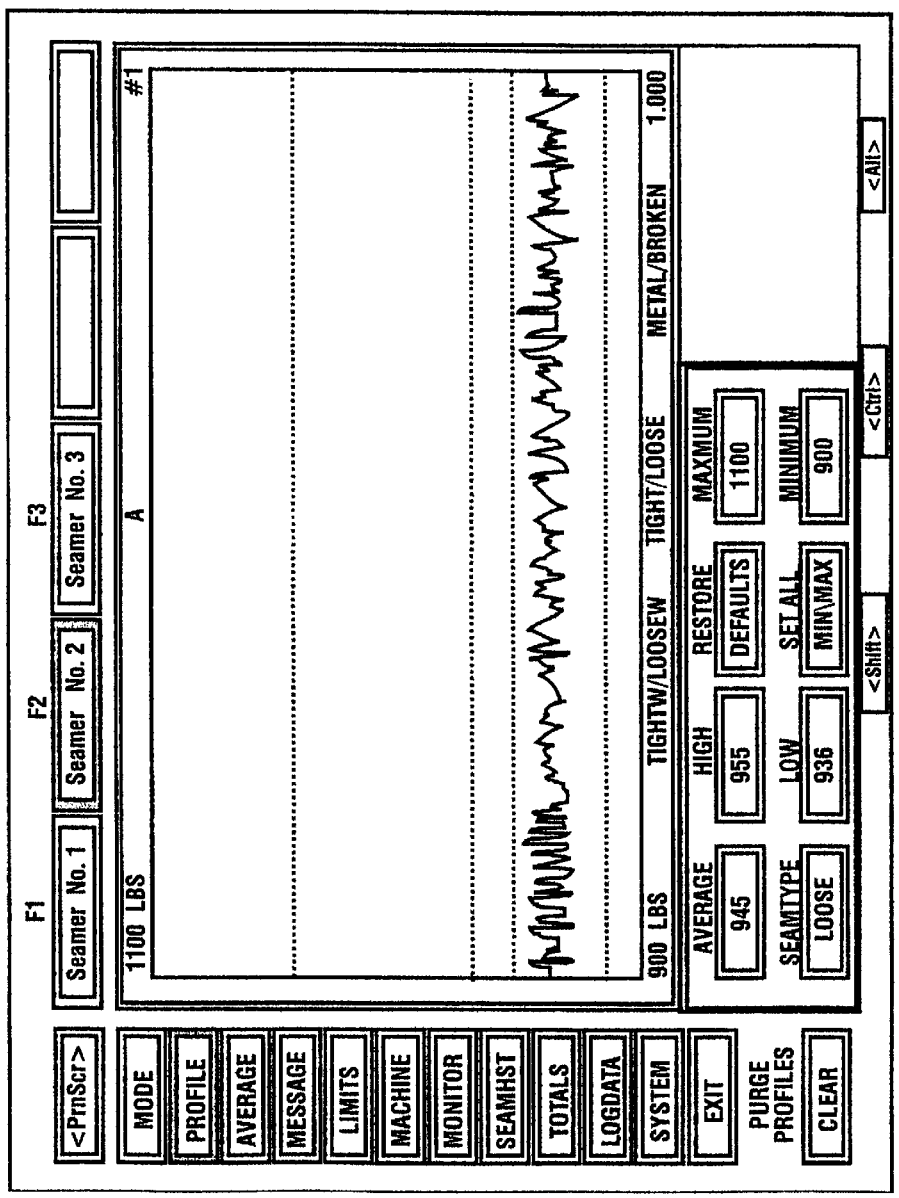
FIG. 16 is a screen display of the host station corresponding to the loose seam shown in FIG. 15.

FIG. 15 shows a loose seam generally indicated 150. Loose seam 150 would produce a seam profile shown in screen display 152 at the host station 38. Loose seam 150 has an average value for its data elements below the low limit threshold value and controller 30 operates in accordance with its programming described in FIG. 9 to set a reject flag which would eventually result in diversion of the can having this seam.

A further fundamental advantage of the invention is that it can identify variations in the force applied to the high dwell portion which are representative of other types of seam defects. Further, the present invention distinguishes sensor signal variations associated with actual force variations from signal variations that may occur due to noise or vibration. The process steps by which controller 30 accomplishes this through its programming is schematically represented with regard to the flow chart shown in FIG. 9.

Figure 9:
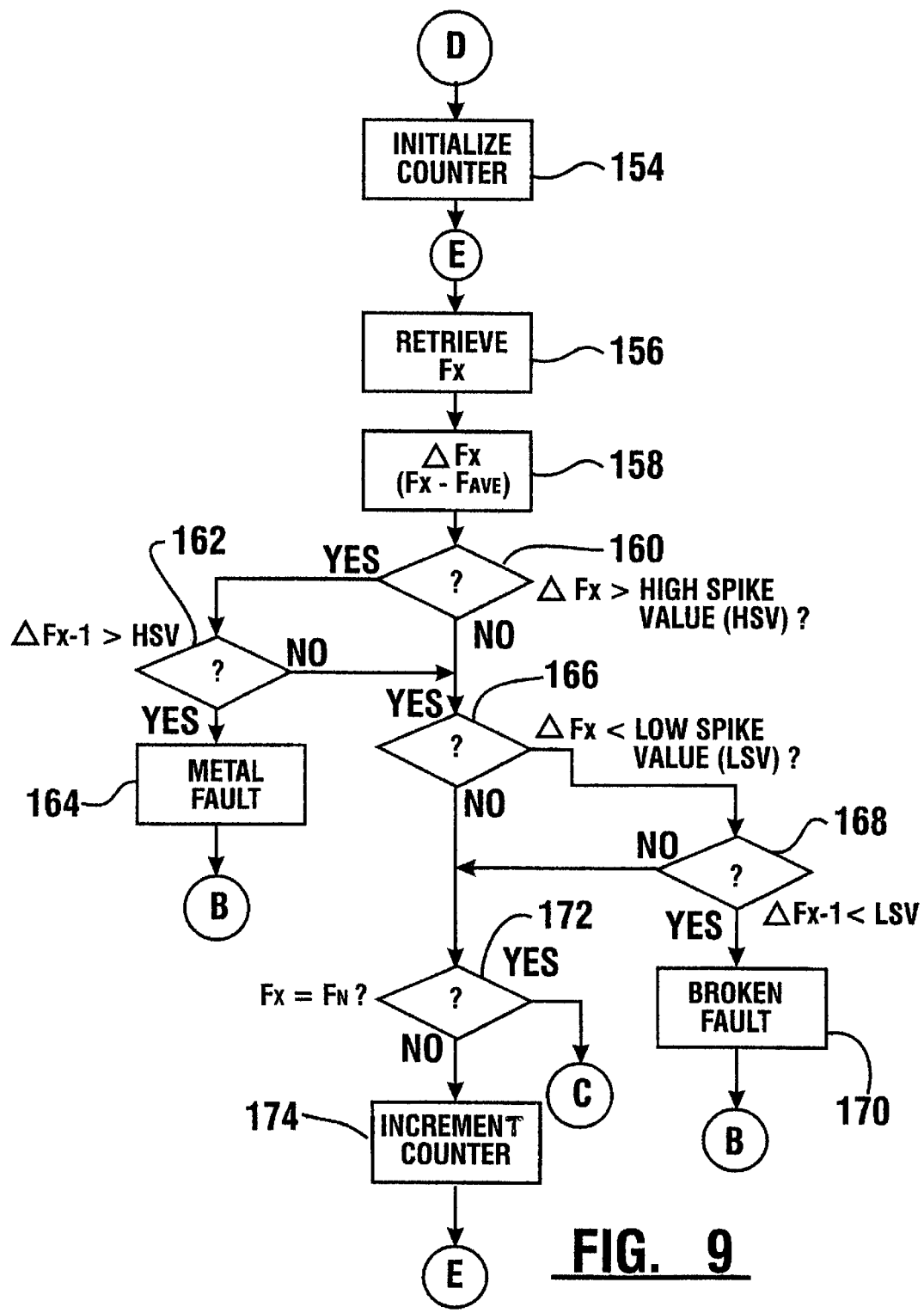

As shown in FIG. 9, the processor in the controller operates to initialize a counting routine at a step 154. The counting routine is used to sequentially retrieve and process the data elements for a particular can passing the high dwell portion. In this example the variable "x" represents the particular element in the sequence that is being processed.

The controller operates to retrieve the first value of x at a step 156. A step 158 is then executed in which the value of x has subtracted therefrom the average force value previously calculated for the passage of that can over the high dwell portion.

The difference between the particular value of x and the average value is then compared at a step 160 to a stored high spike value (HSV). The high spike value is a stored value which represents a variation which is considered likely to be associated with excess metal either on a tooling chuck or roll, or on a can seam. If the high spike value is exceeded, controller 30 then executes a step 162 to determine if the immediately preceding data element also exceeded the high spike value. If so, it is likely that the signal is an actual excessive force indication rather than system "noise". In response to finding two successive data elements exceeding the high spike value, a metal fault is indicated at a step 164. Alternatively, if the preceding data element value is not above the high spike value (or there was no preceding value) step 162 returns to execute a step 166 in which the data element variation from the average is reviewed to determine if it is less than a low spike value (LSV). If so, step 168 is executed to determine if a preceding data element was also below the low spike value. If this is the case it is considered that a low or broken condition of a can, roll or chuck has been detected and a broken fault is given at a step 170.

If neither a high spike value nor a low spike value is detected the processor is programmed to proceed directly to a step 172 to determine if all the data elements in the seam profile have been checked. If not, the processor increments the counter at a step 174 to retrieve the next data element and repeats the process steps.

As shown in FIG. 10, if either a metal fault is given at a step 164 or a broken fault is given at a step 170, a reject flag is set at step 136 in FIG. 10. The seam data and fault condition are then stored in the data store at a step 138.

It should be understood that while in the flow chart shown in FIG. 9 only two contiguous values need to be beyond a high spike or low spike value to designate a fault condition, other embodiments may include programming that requires more than two successive data elements to exhibit the condition before a fault is indicated. This portion of the logic executed by the processor in the controller provides for discrimination between fault conditions and short duration sensor readings beyond the values which can occur due to a variety of conditions such as vibration or interference.

Referring to a screen display 122 in FIG. 6, the "metal level" which corresponds to the high spike value is set at 11.33 Kg. (shown as 25 pounds) above the data element average for the particular seam. In FIG. 6 the "broken level" which corresponds to the low spike value is set at 11.33 Kg. (25 pounds) below the average. Further, as shown in the upper right-hand corner of the screen display the designator "spike length" is set at "2", indicating that two successive data elements must exhibit the condition before a fault is indicated. It should be understood of course that these levels can be set at other values which are appropriate for a particular seamer and can being produced.

Figure 17:
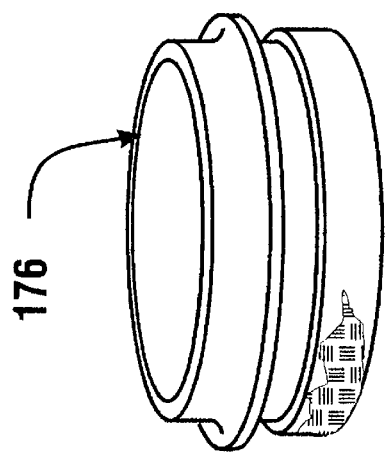
FIG. 17 is an isometric view of a can seam forming chuck including excess metal build-up on a portion of its working surface.
Figure 18:
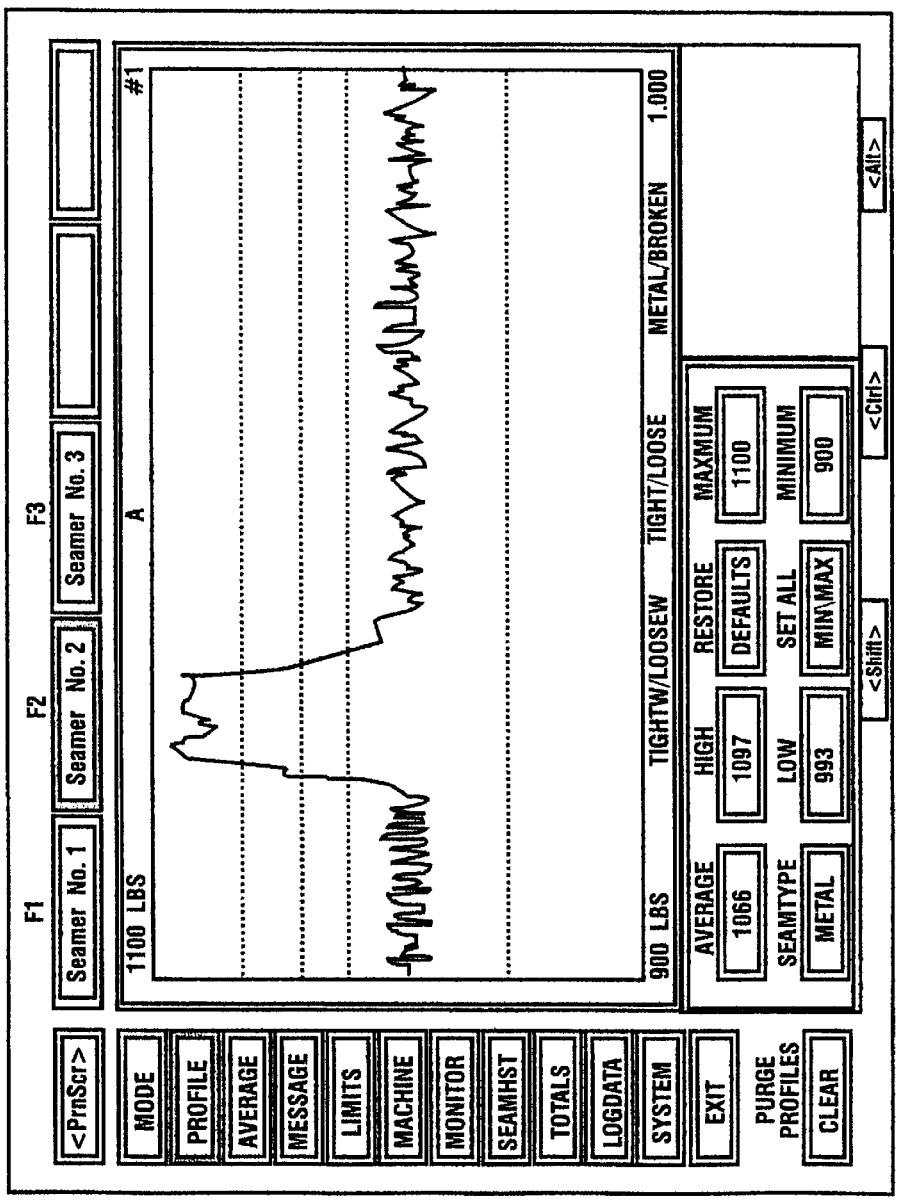
FIG. 18 is a screen display of the host station corresponding to a seam formed using the chuck with metal build-up shown in FIG. 17.

FIG. 17 shows a can forming chuck 176 having metal on a working surface thereof. Screen display 178 in FIG. 18 shows a seam profile corresponding to a seam made with the chuck 176. The seam profile exhibits a dramatic high spike in the area of the extra metal. It should be understood that a can forming roll or a can seam having excess metal about a portion of its circumference will produce a similar metal indication. It should be noted with respect to FIG. 18 that the programmed logic modifies the display so as to indicate the type of fault detected. This is true of all faults within the preferred form of the monitor system.

The screen display of the host station preferably displays lines representative of the tight limits and tight warnings as well as the loose limits and loose warnings in their fixed relative positions. However, the display also provides lines indicating the average for the particular seam profile as well as variations from the average corresponding to the high and low spike limits. These lines vary with the average value of the data elements which comprise the seam profile. In the preferred form of the invention each pair of these lines corresponding to threshold values is presented in a different color to facilitate visual identification of a fault, as well as identification through the fault indicator on the display.

Figure 19:
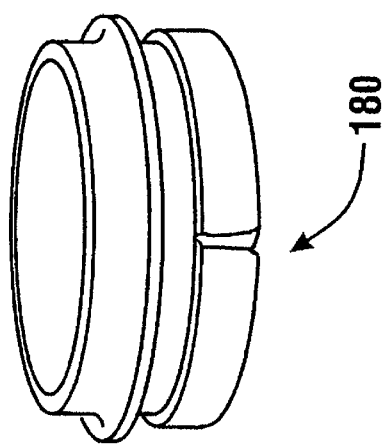
FIG. 19 is an isometric view of a seam forming chuck having a break or gap in its working surface.
Figure 20:
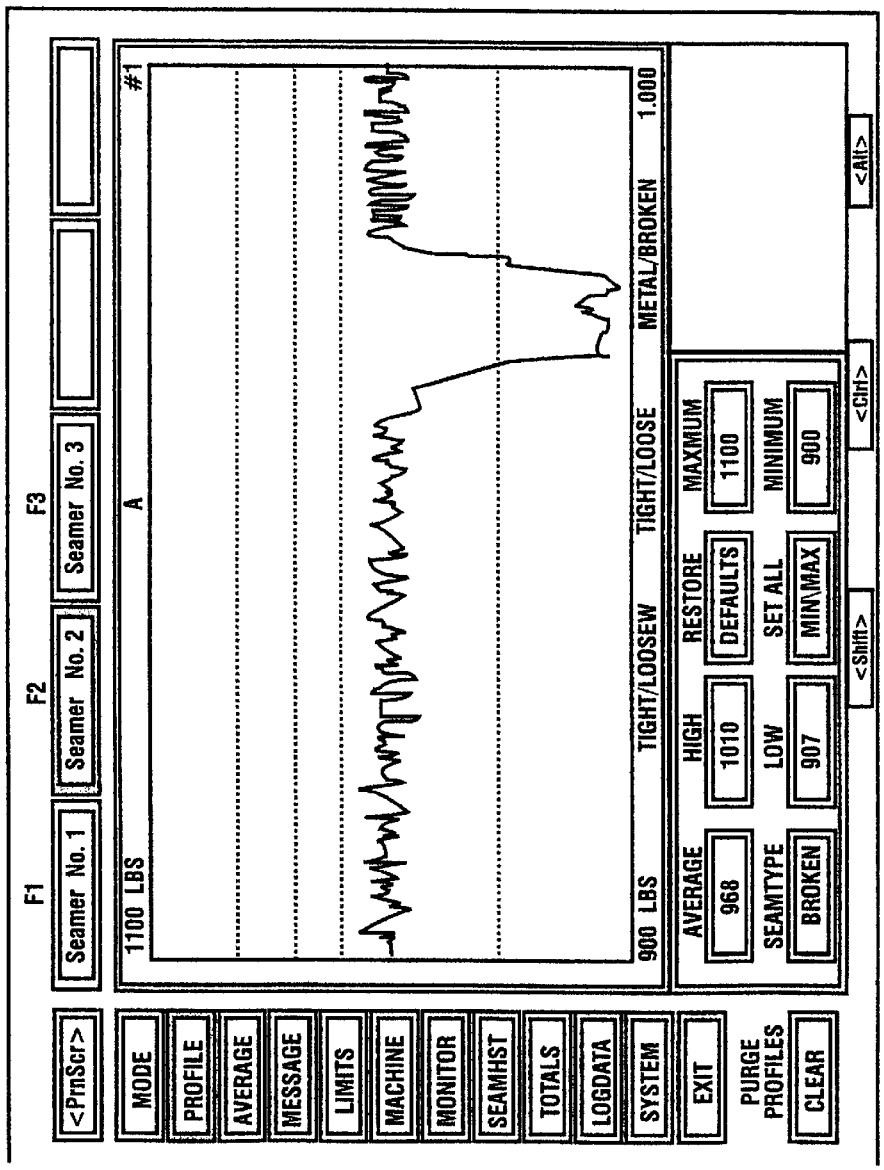
FIG. 20 is a screen display of the host station corresponding to a seam formed with the broken chuck shown in FIG. 19.

FIG. 19 shows a broken chuck 180. Broken chuck 180 is shown with a gap or break so that a portion of its working surface is missing. Screen display 182 shows a corresponding seam profile for a seam made using the broken chuck 180. Of course as before, the screen display 182 also gives an indication of the fault type as well. As shown in screen display 182 the threshold values for limits and warnings remain relatively fixed while the seam profile average and high and low spike limits shift with the particular can seam profile.

It will be understood by those skilled in the art that a seam profile similar to that produced by broken chuck 180 will also be produced if a seam forming roll or a can seam has a missing portion about its circumference. This will result in a low spike corresponding to the area where material is missing.

Figure 21:
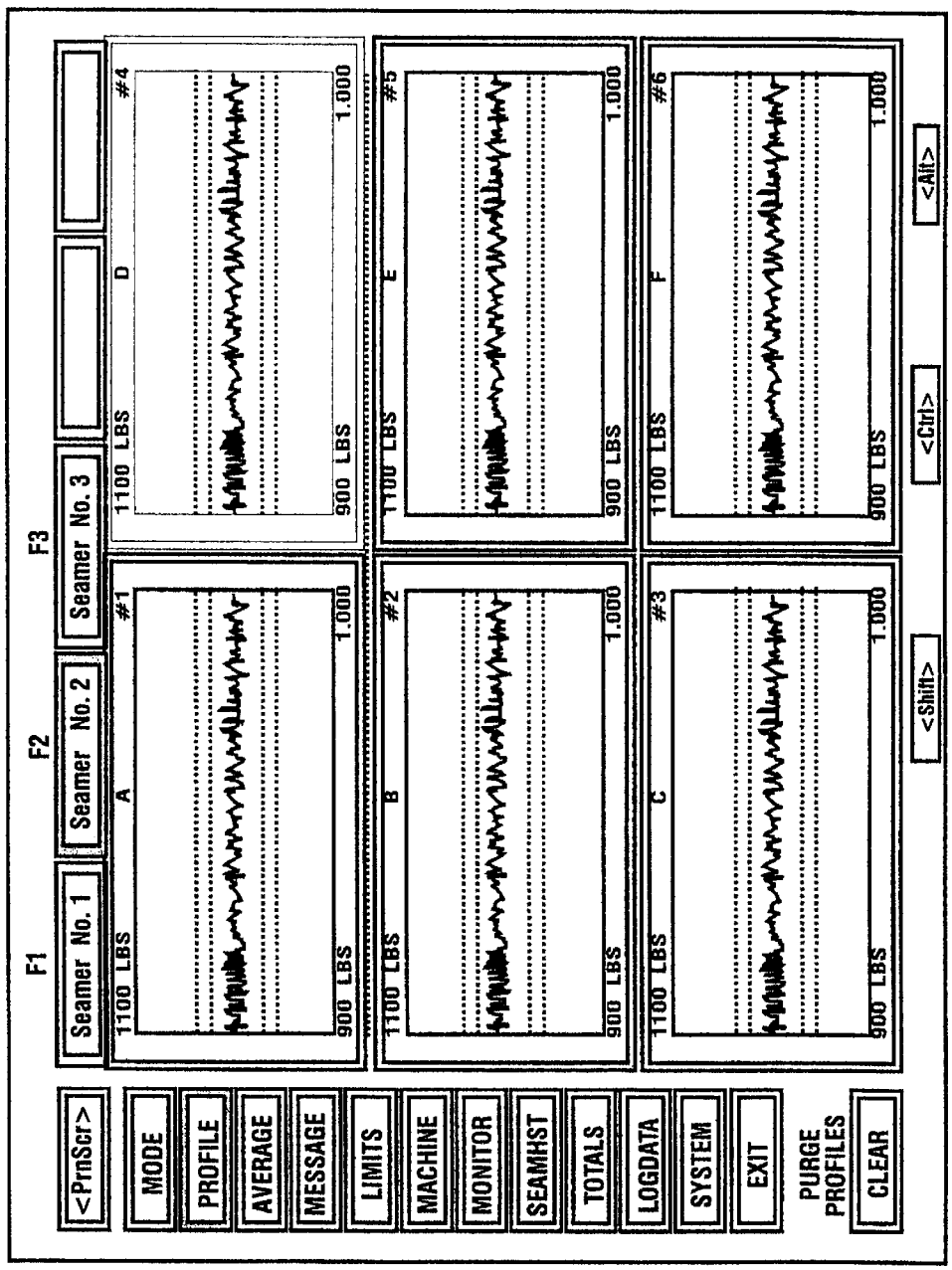
FIG. 21 is a view of a screen display of the host station showing seam profiles produced by all the stations of a six station seam forming embodiment of the invention.
Figure 22:
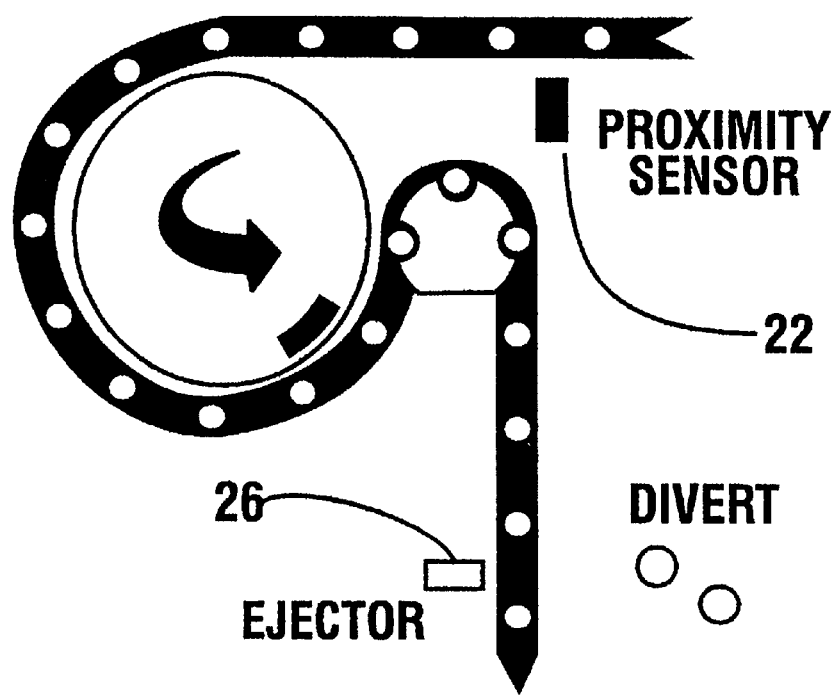
FIG. 22 is a schematic view of a reject portion of the apparatus used for diverting defective cans.

FIG. 21 shows a screen display 184. Screen display 184 is presented on the screen 40 of the host station 38 when it is desired to view the seam profiles produced by the last can to pass through each station of the seamer. As previously discussed, in this illustrative embodiment a six station seamer is used. However, in other embodiments other numbers of stations may be used. The host station 38 is programmed to provide each of the seam profiles in a side by side relationship. This enables comparing differences between the tooling in each station and helps to identify potential problems. Further, the programming of the host station 38 preferably provides for showing the range of force in kilograms, pounds or other units associated with each seam profile. The programming further provides for the scale of the display to be selectively varied to expand the profile either in the vertical or the horizontal direction.

As shown in FIG. 1, can feed sensor 22 is positioned adjacent to the area where can bodies enter an empty station of the seamer 12. Feed sensor 22 is operatively connected to controller 30. Controller 30 includes a processor programmed to control the dispense of a can end on to the open end of a can body by an end feed mechanism after the body has entered the seamer. Controller 30 is programmed so that if can sensor 22 does not sense a can entering a station of the seamer adjacent to the sensor, no can end will be dispensed to that station.

The invention is also preferably operable to track the position of the station in which no can is present. Controller 30 is programmed so that when an empty station reaches the high dwell portion of the cam, data from the force sensor 20 is not sampled in response to the encoder pulses. This avoids the gathering of data which would necessarily indicate a low seaming force due to the absence of a can.

Figure 23:
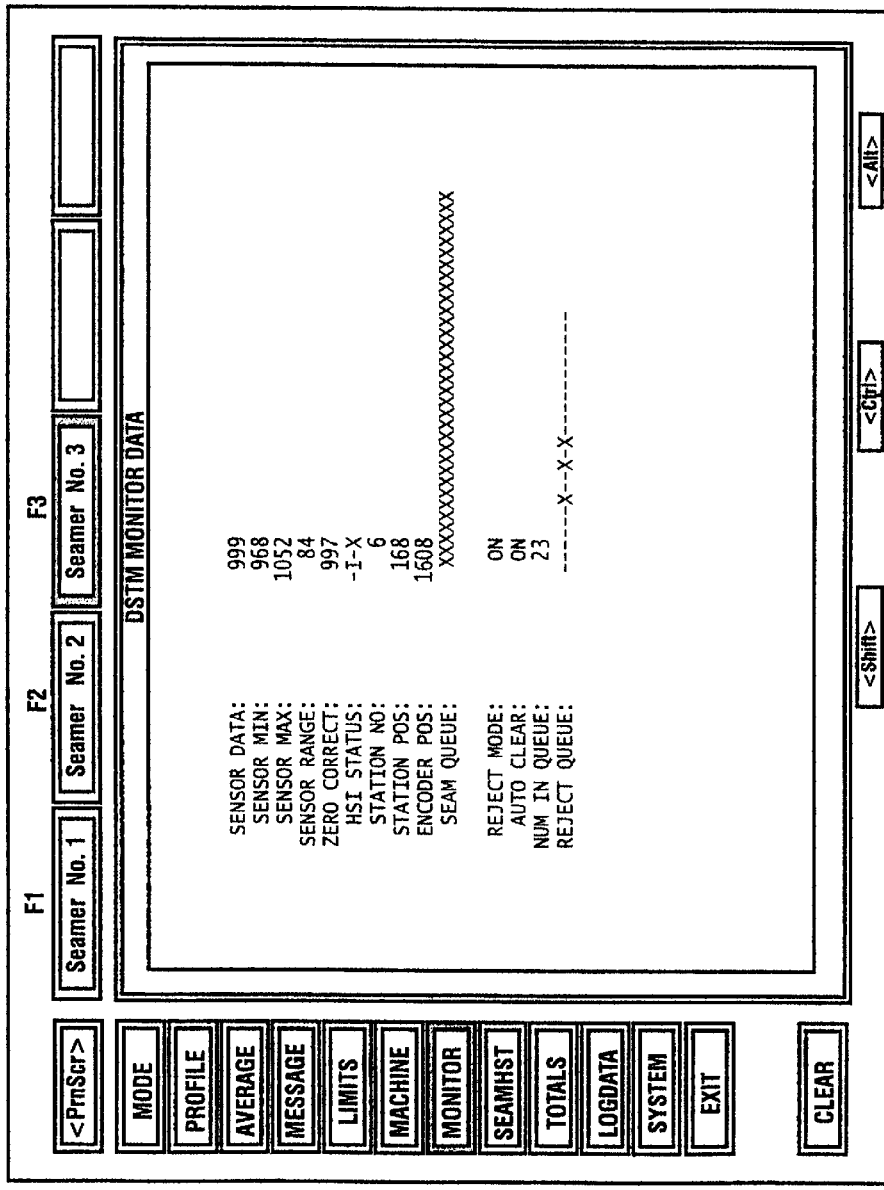
FIG. 23 is a view of a display of the host station showing the seam queue and the reject queue of the apparatus of the present invention.

The absence of such a can passing through the encoder also must be accounted for in the rejection of cans that have been flagged as containing defects. This is accomplished in the preferred embodiment by the controller holding a record queue of cans that are passing through the seamer. If a can is not detected by the feed sensor a null indicator is placed in the queue. When the null indicator reaches the high dwell portion of the cam, sensor readings are not sampled. This is represented graphically in FIG. 23. Output screen 186 shown in the upper portion of FIG. 23 is representative of a display produced on display 34 of the controller 30. Output screen 186 shows the seam queue in the seamer. The "I" is representative of the station adjacent the feed sensor and the arrow head is indicative of the high dwell portion. The designator "X" represent the presence of the can in a station whereas the designator "–" represents the absence of a can. When a station missing a can reaches the level of the high dwell portion signals from the force sensor are not gathered or are alternatively disregarded.

The monitor system 28 also includes a reject portion which operates in connection with the seam queue. The controller 30 operates so that as a can leaves the high dwell portion a designator is added to a reject queue. If the can is one for which no fault condition flag has been set, the designator added to the reject queue is a null indicator which enables the can to pass along the takeaway conveyor 16 to a boxing or packaging operation.

If however the can leaving the high dwell portion is one for which a fault condition has been detected, the setting of the flag causes a defect indicator to be placed in the reject queue. This is represented in display 188 in FIG. 23 which is a screen display for the host station 38. In the reject queue good cans are indicated by the designator "–" whereas cans which have been flagged for having fault conditions are indicated by the designator "X".

In operation, reject can sensor 24 senses each can passing on the takeaway conveyor 16. If the can passing the can sensor corresponds to a "good can" indicator in the reject queue, the can is allowed to pass and the can indicator for that can is deleted from the reject queue once the can passes the sensor without further action. However, if a flagged faulty can is indicated at the queue, when can reject sensor 24 senses that can traveling on the takeaway conveyor, controller 30 actuates can ejector 26. Can ejector 26 is preferably a solenoid actuated gate type can diverter which pushes the particular can off the takeaway conveyor into a storage area. Of course, other types of divert mechanisms may be used depending on the circumstances.

It should be noted that a fundamental advantage of this invention is that even though the cans do not pass on the takeaway conveyor in synchronized relation with the seamer they are nonetheless identified and diverted if necessary. This is true even though the seamer may have stations which do not contain cans. This reject portion of the programming executed by the processor in controller 30 avoids the need to shut down the seamer to retrieve faulty cans. The seamer may continue to operate while the cans, even though moving at high speed, are diverted. This system avoids the need to identify bad seams after they have moved away from the seamer to a location where they are among other cans and the defective can is difficult to identify.

Figure 24:
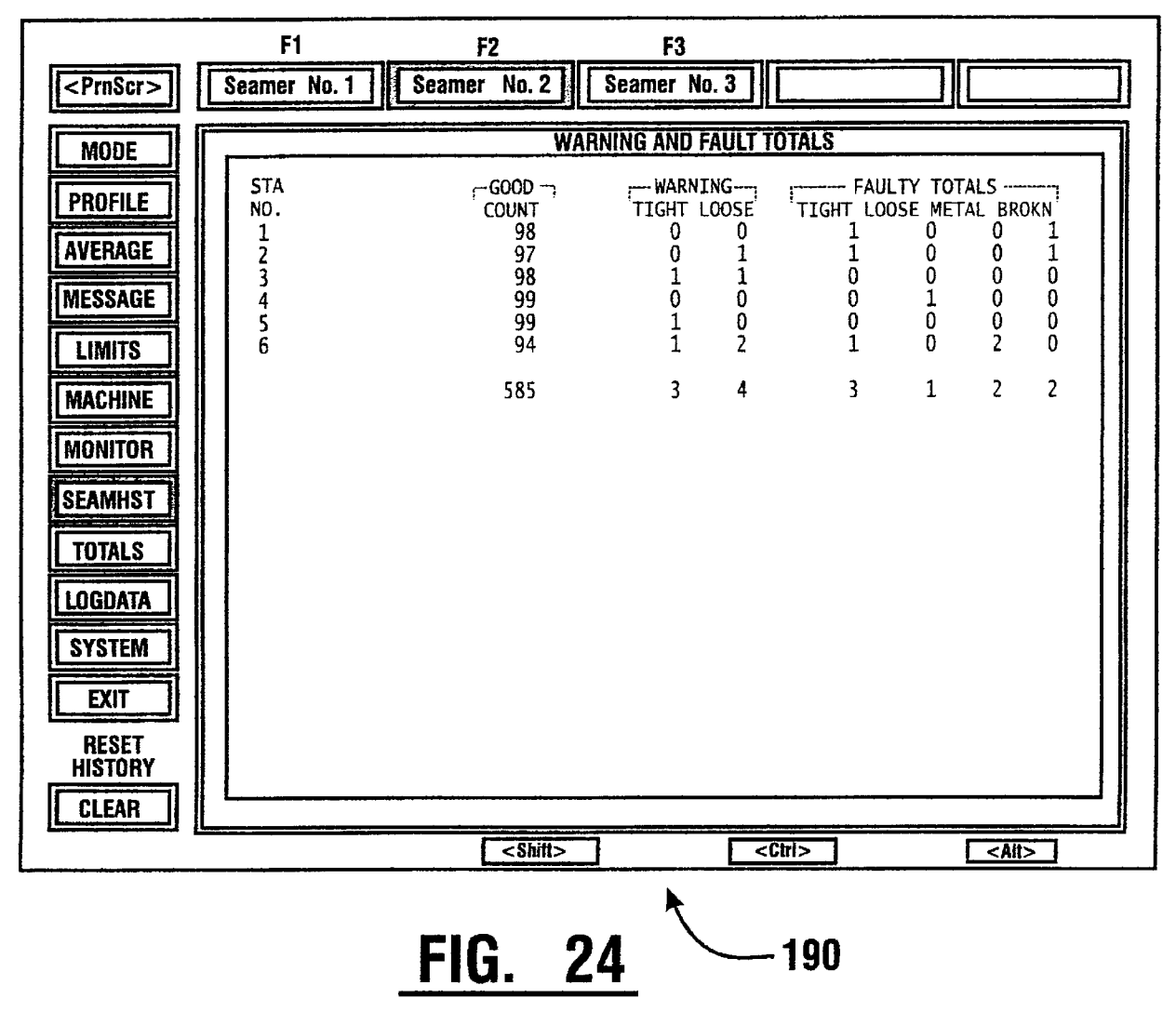

The processor in controller 30 also has in operative connection therewith a data store 32 wherein data concerning force levels as well as totals of cans exhibiting various conditions are stored. This information may be selectively retrieved at the host station 38 through its programming to produce a screen display such as screen display 190 shown in FIG. 24. Screen display 190 shows data associated with each station of the seamer which exhibits characteristics beyond the warning or fault threshold values.

Figure 25:
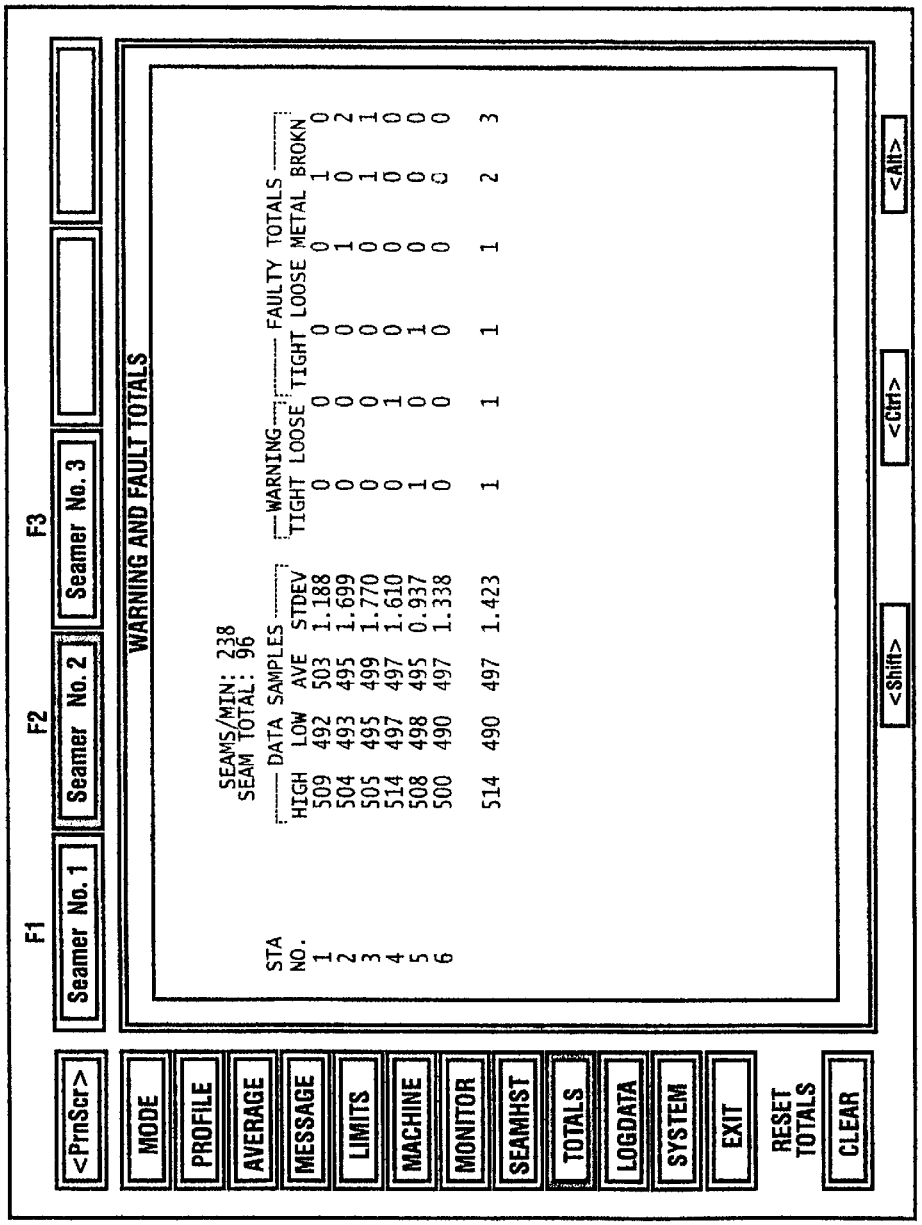
FIG. 25 is a view of a screen display of the host station disclosing totals for seam data at each station of the six station embodiment.

Host station 30 is further programmed to enable providing more detailed data about the seaming operations in the various stations. FIG. 25 shows a screen display 192 which can be selectively displayed at the host station. Screen display 192 includes totals which provide the high, low and average seaming force for each station, as well as a calculated standard deviation value based on a normal distribution. The values of cans exceeding the various thresholds are also provided. This enables comparing the performance of the various stations to one another. Such data may be useful in determining the need for set-up adjustment or tooling change.

Figure 26:
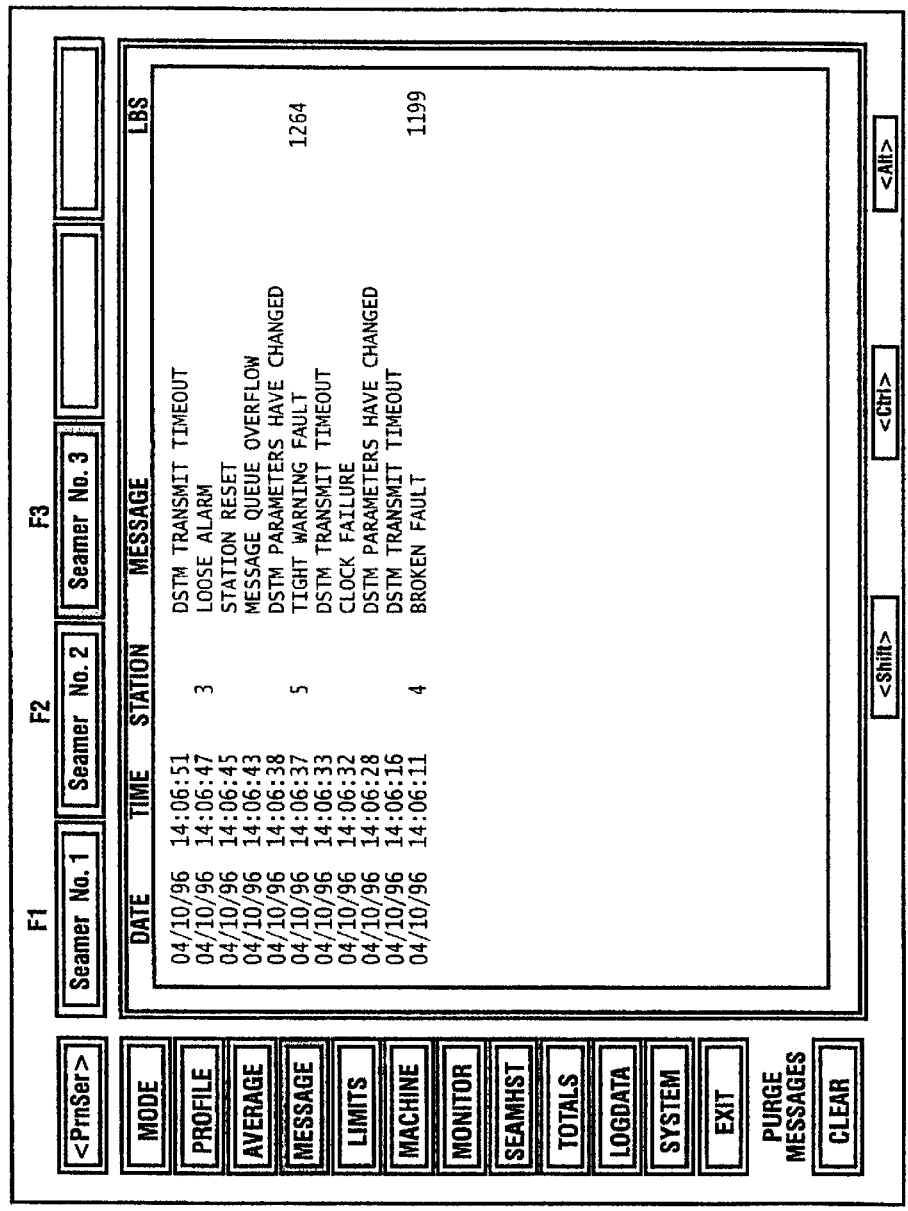
FIG. 26 is a view of a screen display of the host station showing a log of messages in the monitoring system portion of the apparatus.

The preferred form of the apparatus of the present invention is also programmed to provide a record of messages, including seam faults which have been determined by the monitor system. This is graphically demonstrated in a screen display 194 in FIG. 26. Screen display 194 contains a listing of the fault and other messages produced by the system, along with the time and seamer station associated with each message. These records include instances of seams exceeding the fault threshold values previously discussed. As demonstrated with respect to screen display 194, the messages include not only those associated with limits and warnings, but also with failures of communication features as well as indications that set-up parameters have been changed.

It should also be understood that host station 38 may selectively monitor parameters associated with several seamers. The operatively connected seamer for which data is displayed may be selected using input devices such as the mouse 44 or keyboard 42. The particular seamer for which data is being viewed is designated by the highlighted seamer icon which is shown in the upper portion of the display in the preferred embodiment. For example, in FIG. 25 the data shown is from the seamer designated number 2 whereas in FIG. 26 the data shown is from the seamer designated number 3. It should be understood that while three seamers are shown, data for more or fewer seamers may be monitored from a single host station.

It should be understood that controller 30 in embodiments of the invention is programmed to actuate alarm devices 36 upon the occurrence of particular events. Such alarms may be appropriate when it appears that consistently bad seams are starting to be produced and immediate attention to the system is required. The alarm devices 36 may be one or more warning lights as schematically shown, and/or an audible warning such as a bell or siren. Such alarm devices may also include transmission of messages to the host station 38 or to a terminal in a remote location such as a production office.

The set up of the circumstances in which indications of alarm conditions as well as warning conditions are given using the alarm devices is graphically represented with respect to FIG. 6. As indicated by the column of icons under "alarms" designated "tight freq", "loose freq", "metal freq" and "broken freq", an alarm is set to be given if two successive cans exhibit one of these fault conditions. An alarm condition may be given by a red light or siren.

Alternatively, an alarm condition may also cause controller 30 to open a relay contact in connection with a drive motor of the seamer or a conveyor that feeds can bodies to the seamer. Such actions are effective to stop seam forming operations when an alarm has been given. Likewise as shown in FIG. 6, in the column under "warning", the settings of "tight freq" and "loose freq" indicate that a warning will be given if two successive cans indicate either of the warning conditions. For example, a warning may be indicated by a flashing yellow light associated with the seamer. As warning conditions generally do not require seamer shutdown, controller 30 is preferably programmed so the seamer and/or feed conveyor are not automatically shut down in these circumstances.

The computer programs executed by the processor within the controller 30 to achieve the presentation of the alarms or the warnings is readily appreciated with regard to the flow charts previously discussed which are used to identify fault and warning conditions. Because the controller is operative to store a record of the fault or warning conditions associated with data for each can, the controller is operative to check whenever such a condition is indicated to determine if a preceding can exhibited the same fault or warning condition. When the set number of successive seams exhibits the condition, for example two successive tight seams, the warning is given. Alternatively, the system may be programmed so that if the number of common fault or warning conditions which are detected within a set of cans exceeds certain frequencies, a warning is given or a shutdown of seaming operations is automatically accomplished.

The seam forming apparatus of the invention can be programmed to meet the requirements of a particular double seaming operation. In situations where very tight limits are required, the present invention will enable accurate set up and maintenance of seam quality. Likewise, in situations where a broader range of values can be tolerated, the present invention enables operation within that range without unnecessary downtime.

Thus, the new double seam forming apparatus of the present invention achieves the above stated objectives, eliminates difficulties encountered in the use of prior devices and systems, solves problems and attains the desirable results described herein.

In the foregoing description certain terms have been used for brevity, clarity and understanding, however no unnecessary limitations are to be implied therefrom because such terms are for descriptive purposes and are intended to be broadly construed. Moreover, the descriptions and illustrations herein are examples and the invention is not limited to those details shown or described.

In the following claims any feature described as a means for performing a function shall be construed as encompassing any means capable of performing the function and shall not be deemed limited to the particular means described for performing that function in the foregoing description.

Having described the features, discoveries and principles of the invention, the manner in which it is constructed, operated and utilized, the advantages and useful results attained; the new and useful structures, devices, elements, arrangements, parts, combinations, systems, methods, equipment, operations and relationships are set forth in the appended claims.

We claim:

1. A double seam forming apparatus for applying end units to can bodies, comprising:
   a cam including a seaming track, the track including a sensing portion, wherein a cam follower in operative connection with a can seam moves in engaged relation with the seaming track across the sensing portion;
   a sensor in operative connection with the cam, wherein the sensor generates a signal responsive to force applied by the cam follower to the sensing portion; and
   a monitor apparatus in operative connection with the sensor wherein the monitor apparatus is operative to generate a plurality of data elements responsive to the signal as the cam follower moves across the sensing portion, and wherein the monitor apparatus is further operative to generate an average of the plurality of data elements, and to generate an indication signal when at least one data element varies from the average by at least a value.

2. A double seam forming apparatus for applying end units to can bodies, comprising:
   a cam including a seaming track, the track including a high dwell portion, wherein a cam follower in operative connection with a seam of a can moves in engaged relation across the high dwell portion;
   a force sensor in operative connection with the cam wherein the sensor generates a signal responsive to force applied by the cam follower to the cam in the high dwell portion;
   a monitor apparatus in operative connection with the sensor, wherein the monitor apparatus:
   is operative to sample the signal at a plurality of locations of the follower as the follower moves across the high dwell portion;
   is operative to generate data elements responsive to each sampled signal;
   is operative to average the data elements;
   is operative to compare the data elements and the average; and
   is operative to generate a first signal responsive to variation of the data elements from the average by at least a value.

3. An apparatus according to claim 2 wherein said monitor apparatus is further operative to determine a number of successive data elements varying from the average by at least the value, and wherein the first signal is generated responsive to the number reaching a first limit.

4. The apparatus according to claim 2 wherein the monitoring apparatus is further operative to reduce each data element by a corresponding base line element for each of the plurality of locations of the cam follower, wherein the base line elements correspond to force applied by the follower in engagement with an acceptable can seam.

5. The apparatus according to claim 4 wherein each of the base line elements is determined by a process including the steps of placing a known acceptable can seam in operative connection with the cam follower, moving the cam follower across the high dwell portion in engagement with the known acceptable can seam, repeating the process steps with a second plurality of known acceptable can seams, and averaging the second plurality of data elements that correspond to the sampled signals from each of the plurality of locations on the high dwell portion associated with the second plurality of known acceptable can seams.

6. The apparatus according to claim 2 wherein the monitor apparatus is further operative to store a limit threshold value, and to produce a limit signal responsive to the average of the data elements exceeding the threshold value.

7. The apparatus according to claim 6 wherein said monitor apparatus further includes a data store including data corresponding to at least one preceding can, and wherein the monitor apparatus is further operative to give a warning signal when the average of the data elements for the can and for the preceding can exceed the threshold value.

8. The apparatus according to claim 2 wherein the double seam forming apparatus further includes a feed sensor wherein the feed sensor senses the can, and wherein the feed sensor is in operative connection with the monitoring apparatus, and wherein the monitoring apparatus ceases to sample the signal responsive to the feed sensor failing to sense said can.

9. The apparatus according to claim 2 wherein the seam forming apparatus further comprises:
   a movable member including a second plurality of stations, wherein cans are positionable in each station, and wherein the movable member moves between a feed position wherein a can is delivered to a station on the member, a sensing position disposed from the feed position, wherein in the sensing position a seam of the can in the station is in operative connection with the cam follower in the high dwell portion, and a discharge position wherein the can is discharged from the movable member;
   a feed sensor adjacent the feed position wherein the feed sensor generates a signal responsive to a can entering a station at the feed position;
   an encoder in operative connection with the movable member, wherein the encoder provides a movement signal responsive to movement of the movable member from the feed position to the sensing position;

a reject sensor adjacent the discharge position wherein the reject sensor generates a reject sensor signal responsive to sensing a can discharged from the movable member;

a can ejector device adjacent the reject sensor wherein the ejector device is operable to selectively divert cans; and wherein the feed sensor, encoder, reject sensor and diverter device are in operative connection with said monitor apparatus, and wherein the monitor apparatus is operable to track a can entering a station of the movable member from the feed position to the sensing station based on the movement signal, to flag as defective the tracked can responsive to the first signal, and to actuate the ejector device to divert the flagged can responsive to the reject sensor signal.

10. The apparatus according to claim 9 wherein the monitor apparatus is operative to disregard signals from the force sensor when a can is not present in a station at the sensing position.

11. The apparatus according to claim 2 wherein the cam includes a relatively rigid base portion, and wherein the high dwell portion is more readily deformable relative to the base portion, and wherein the cam includes a reinforcing portion, wherein the reinforcing portion engages the high dwell portion and the base portion responsive to deformation of the high dwell portion.

12. The apparatus according to claim 11 wherein the cam is generally disc shaped, and wherein the high dwell portion is generally arcuate in diametric cross section, and wherein the cam includes a generally radially extending slit between the base portion and the high dwell portion, and wherein the reinforcing portion extends from the base portion and into an opening in said high dwell portion, and wherein the opening is bounded by a wall, and wherein the reinforcing portion engages the wall upon deformation of the high dwell portion.

13. A double seam forming apparatus for applying end units to can bodies, comprising:

a cam including a seaming track, the track including a sensing portion, wherein a cam follower in operative connection with a can seam on a can moves in engaged relation with the seaming track across the sensing portion;

a sensor in operative connection with the cam, wherein the sensor generates a signal responsive to force applied by the cam follower to the sensing portion, and wherein the signal produces a can seam profile as the cam follower moves across the sensing portion in engagement with the can seam;

a monitor apparatus in operative connection with the sensor, wherein the monitor apparatus is in operative connection with a data store, and wherein the data store stores data representative of a base line profile, and wherein the monitor apparatus is operative to reduce one of either the can seam profile or the base line profile by the other of the can seam profile or the base line profile.

14. The apparatus according to claim 13 wherein the monitor apparatus comprises a display and wherein the monitor apparatus is operative to display data corresponding to a difference between the can seam profile and the base line profile.

15. The apparatus according to claim 13 wherein said base line profile comprises data corresponding to an average of a plurality of other can seam profiles previously generated by the sensor as the cam follower moved across the sensing portion in engagement with such plurality of other cans.

16. The apparatus according to claim 13 wherein the apparatus comprises a plurality of cam followers, wherein each cam follower is engageable with a separate can, and each can provides a separate can seam profile as the respective cam follower moves across the sensing portion in engagement with the can;

and wherein the data store includes a plurality of base line profiles, each of said base line profiles corresponding to one of said cam followers, and wherein the monitor apparatus is operative to reduce each one of either the can seam profile or the base line profile by the other of its respective can seam profile or base line profile.

17. The apparatus according to claim 13 wherein the signal is sampled by the monitor apparatus at a plurality of locations as the cam follower moves across the sensing portion and wherein the base line profile includes values corresponding to the plurality of locations.

18. The apparatus according to claim 17 wherein the base line profile is produced by a process comprising the steps of: engaging at least one other can having another seam with the cam follower, moving the cam follower in engagement with the other seam across the sensing portion, sampling the signals at the locations as the cam follower moves across the sensing portion in engagement with the other seam, and storing the sampled signals corresponding to the locations in the data store.

19. The apparatus according to claim 18 wherein the process further comprises repeating the process steps with at least one additional can and the further step of averaging the stored sampled signals for each location.

20. A double seam forming apparatus for applying end units to can bodies, comprising:

a cam including a seaming track, the track including a sensing portion, wherein a cam follower in operative connection with a can seam on a can moves in engaged relation with the seaming track across the sensing portion;

a sensor in operative connection with the cam, wherein the sensor generates a signal responsive to force applied by the cam follower to the sensing portion;

a monitor apparatus in operative connection with a data store, wherein the monitor apparatus is operative to sample the signal at a plurality of locations in a sequence as the cam follower moves across the sensing portion, and wherein the data store includes data representative of a limit, and wherein the monitor a apparatus is operative to compare each sampled signal to the limit, and if a first sampled signal is outside the limit, to determine if at least one other sampled signal adjacent to the first signal in the sequence is outside the limit, and if said other signal is outside the limit, to generate a limit signal indicative of an outside limit condition.

21. The apparatus according to claim 20 and further comprising an input device in operative connection with the monitor apparatus, wherein the input device enables selectively inputting a number representative of adjacent sampled signals in the sequence, and wherein the monitor apparatus is operative to generate the limit signal responsive to the number of adjacent sampled signals in the sequence being outside the limit.

* * * * *

UNITED STATES PATENT AND TRADEMARK OFFICE
CERTIFICATE OF CORRECTION

PATENT NO. : 6,623,230 B1 Page 1 of 1
DATED : September 23, 2003
INVENTOR(S) : Ali Bagheri et al.

It is certified that error appears in the above-identified patent and that said Letters Patent is hereby corrected as shown below:

<u>Column 22,</u>
Line 50, "monitor a" should read -- monitor --.

Signed and Sealed this

Twentieth Day of January, 2004

JON W. DUDAS
*Acting Director of the United States Patent and Trademark Office*